United States Patent

[11] 3,614,682

[72] Inventor Robert C. Smith
 Houston, Tex.
[21] Appl. No. 48,954
[22] Filed June 22, 1970
[45] Patented Oct. 19, 1971
[73] Assignee The Firestone Tire & Rubber Company
 Akron, Ohio
 Continuation of application Ser. No.
 434,845, Feb. 24, 1965, now abandoned.

[54] DIGITAL COMPUTER CONTROL OF POLYMERIZATION PROCESS
 4 Claims, 6 Drawing Figs.
[52] U.S. Cl. .................................................235/151.12,
 208/159, 208/164, 260/767, 340/172.5
[51] Int. Cl. ......................................................... G06f 15/46
[50] Field of Search ............................................ 235/150.1,
 151.1, 151, 151.12; 260/1, 94.3–94.8, 767;
 208/159, 164

[56] References Cited
 UNITED STATES PATENTS

| | | | |
|---|---|---|---|
| 3,256,262 | 6/1966 | Irvin ............................ | 260/94.3 |
| 3,275,809 | 9/1966 | Tolin et al. .................... | 235/151.12 |
| 3,296,097 | 1/1967 | Lupfer .......................... | 235/151.12 X |
| 3,321,280 | 5/1967 | Trotter et al. .................. | 235/151.12 X |
| 3,351,430 | 11/1967 | Amrehn et al. ................ | 235/151.12 X |
| 3,378,483 | 4/1968 | Worrell et al. ................. | 208/164 |
| 3,410,793 | 11/1968 | Stranahan et al. ............. | 208/159 |

Primary Examiner—Malcolm A. Morrison
Assistant Examiner—Felix D. Gruber
Attorneys—S. M. Clark and Willard L. G. Pollard ABSTRACT: Changes in component concentration, heat history, and other variables which cannot be directly measured in the successive reactors in a train of polymerization reactors, are followed by periodically numerically integrating, by a digital computer, for each reactor and for each of the variables, the equation $$\frac{dx_{i,n}}{dt} = \frac{F}{V}(x_{i,n-1} - x_{i,n}) + \frac{\partial x_{i,n}}{\partial t} \quad (1)$$

where
 $x$ = a process variable, e.g., concentration, conversion, etc.
 $i$, as the first subscript of $x$, signifies that this is the $i$th of $I$ variables
 $n$, as the second subscript of $x$, means that this is the value of this variable in the $n$th one of the reactors on the line—thus $x_{i,1}$ means the value of $x_i$ in the first reactor 64–1 etc.
 $F$ = total volumetric flow rate
 $V$ = volume of the $n$th reactor
 $t$ = time difference under the reaction conditions
 $\frac{\partial x_{i,n}}{\partial t}$ = overall rate of generation or degeneration of $x_{i,n}$ under the conditions obtaining the $n$th reactor The resultant calculated values of these variables, together with directly measured values of other variables, are manipulated by the computer and used to adjust the rate of feed of reagents and other conditions of polymerization in the train.

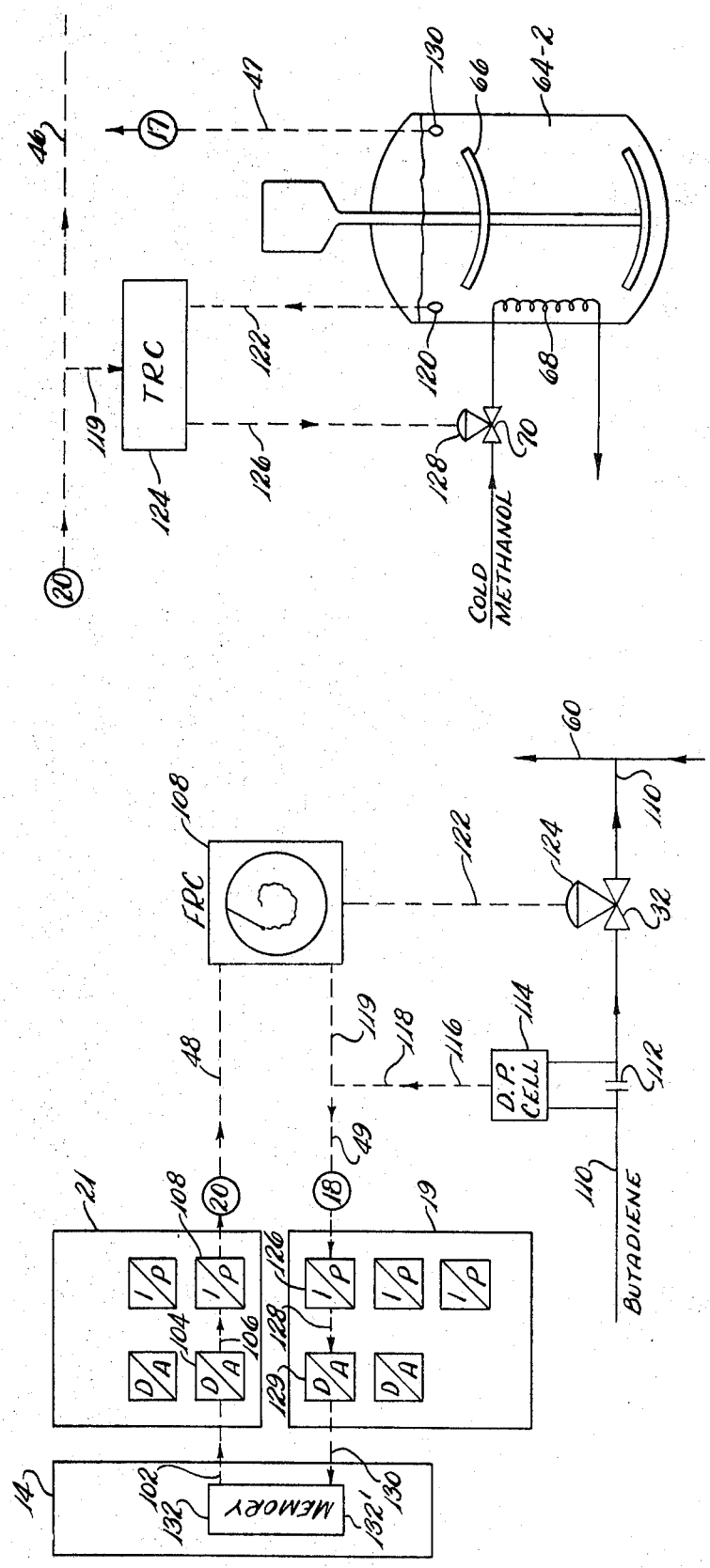

1 HIGH ACTIVATOR, LOW CATALYST
2 NORMAL ACTIVATOR, LOW CATALYST
3 LOW ACTIVATOR, HIGH CATALYST

DIGITAL COMPUTER CONTROL OF POLYMERIZATION PROCESS

RELATED APPLICATIONS

This application is a continuation of my earlier copending application Ser. No. 434,845 filed Feb. 24, 1965, and now abandoned.

This invention relates to the polymerization of monomeric materials, and particularly conjugated diolefins such as butadiene and the like, and still more particularly to a method and plant for conducting such polymerization in an exactly controlled, reproducible manner.

Typically the conjugated diolefins such as butadiene are polymerized and copolymerized in continuously operating plants comprising a series of stirred reactors connected in cascade, each reactor continuously receiving discharge of the preceding reactor in the series and discharging continuously into the succeeding reactor in the series. The ingredients such as butadiene and styrene (hereinafter, for brevity the conjugated diolefin monomer will be referred to as "butadiene" and the comonomer will be referred to as "styrene," although it will be understood, as more fully explained below, that other monomers of these respective types may be used) emulsifying agent, catalyst, modifier, activator, etc. are fed into the first reactor in the series, the ingredients are progressively polymerized to form a latex as they pass through the successive reactors, and the resultant latex taken from the end of this series of reactors. A shortstop is added to arrest further polymerization, and residual monomers distilled out of the product. Control of this process is extremely difficult, particularly in view of the long holdup time (on the order of 13 hours or so), and automatic control has not heretofore been successful. Accordingly the manipulation of the process has been left largely to the experience and discretion of human operators. In such a process the operator will have three fairly rigid targets in view. First there is the production schedule which is quite inflexible; so many tons of the particular type of polymer, and no more, have been ordered to come off the line for economic reasons, or there has been an obstruction in the coagulation, drying etc. equipment, and production must be curtailed. The operator generally takes care of this in a rigid manner by feeding the required amount of each raw material in an amount specified by the particular recipe to the system. Secondly there is the conversion to be controlled, i.e. the percentage of butadiene and/or other monomers which shall be converted to polymer during its passage through the line of reactors. This must also be rather rigidly controlled (1) so as not to overload the monomer stripping equipment and (2) more importantly, to maintain polymer properties such as Mooney viscosity, modulus, elongation and tensile strength. In order to achieve the desired conversion, the operator loads the ingredients into the system at relative rates which, in his judgment and bearing in mind the recipe and throughput schedules, will yield the desired results; but this is a very highly uncertain control due to the long holdup of the ingredients, and at best only approximate predetermination of conversion can be achieved in this manner. The final adjustment, which usually has to be rather extensive, is taken care of in a rough and ready manner by tapping off the product higher up, or lower down the line; e.g., if the product coming off at the 19th reactor is too high in conversion, the line is shortened by cutting out the 19th reactor and tapping off from the 18th or vice versa, if conversion at the 19th reactor is too low, the line is lengthened by cutting in an additional reactor after the 19th. Much the same result can be obtained by injecting a polymerization arresting shortstopping agent at the reactor in the line where polymerization appears to have progressed to the desired conversion. Such control is obviously extremely cumbersome, since it involves physical cutting in and cutting out of major pieces of equipment on frequent short notice. This mode of operation also leaves greater or lesser proportions of the equipment idle at all times. It has also been proposed to raise or lower the temperature in the reactors in a train in response to deviation of the output from target values. As crudely carried out this is also very difficult and unsatisfactory, first because the long holdup makes such a control attempt subject to long oscillations, and also because it disturbs the properties of the product, which are not necessarily the same when the polymerization is carried out at different temperatures, even though the same final conversion is achieved. It will be noted that essentially the only effective control is maintained by adjusting conversion and temperature, and the effect of impurities, concentration of charge materials, system disturbances, pressure variations etc., are largely ignored.

Accordingly it is an object of this invention to provide a novel process and control for the polymerization and copolymerization of butadiene and other conjugated diolefins.

Another object is to provide such a process which may be readily controlled to produce polymeric products of uniform properties, particularly uniform and optimum conversion and Mooney viscosity, modulus, elongation and tensile strength.

Another object is to provide such a process which may be carried out with full and continuous utilization of all the reactors in the plant, without leaving a portion of the reactors unused as in the prior practice where control of conversion is achieved by cutting out a greater or lesser number of reactors at the latter part of the reactor series.

A still further object is to provide such a process in which the transition from one level of throughput to another may be readily effected without a decrease in product quality.

A further object is to effect the foregoing objects by means of controls imposed by a digital computer.

Other objects will be apparent from the discussion and description of the invention to follow. The invention will be described in connection with the accompanying drawings, wherein:

FIG. 2 is a diagram of a typical control for the flow of materials, responsive to and reporting to the control computer;

FIG. 3 is a diagram of a control analogous to that of FIG. 2 for the control of temperatures in reactors in the early part of the reactor train;

SYNOPSIS OF THE INVENTION

Figure 1:
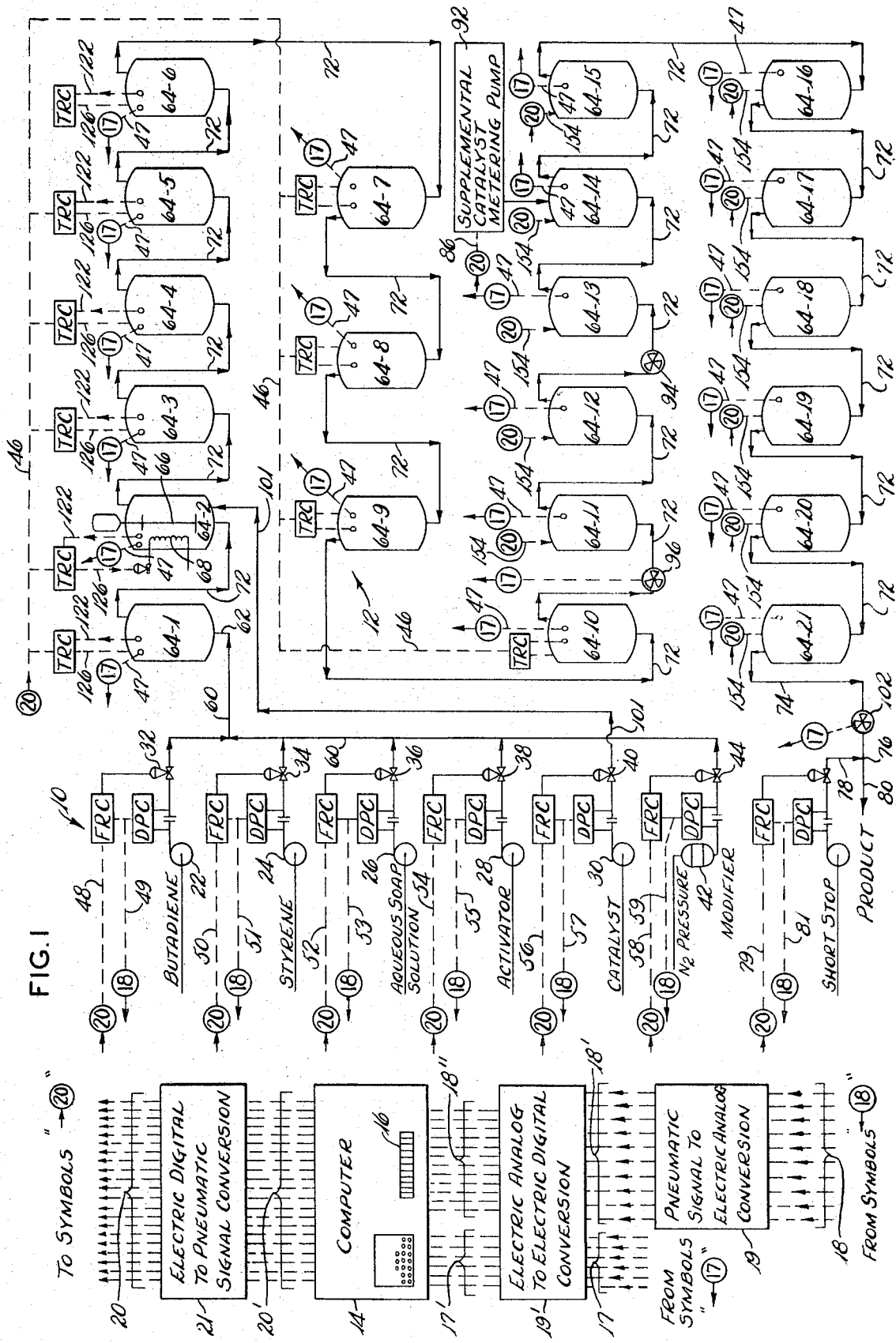
FIG. 1 is a flow chart of a plant for operation in accordance with this invention.

Referring to FIG. 1, there is shown a synthetic rubber plant according to this invention. It is comprised of a controlled system of charge streams section 10 which are blended in a common line and charged to the train 12 of polymerization reactors whose temperatures are controlled by circulating methanol coolant through cooling coils inside the reactors. There is a digital computer 14 [in this specific instance, a TRW 330 computer, (trademark of the Thompson Ramo Woolridge Company) although other digital machines may be used] (a) which receives telemetered information through electric analog signal lines 17 and pneumatic signal lines 18 as to conditions which exist in the charge section and at various points of the reactor train 12; (b) which transmits telemetered control signals through lines 20 to the charge section 10 and to various points in the reactor train 12; and (c) into which the following information may be entered by the use of the operator's console keyboard 16:

1. Management—dictated production requirements
2. Different type or types of production required
3. Laboratory analysis of current raw materials
4. Product properties, etc.

It will be understood that the measuring devices and control mechanism in the supply section 10 and reactor train 12 may be of the pneumatic type or electronic type, whereas the computer 14 must operate upon digital values. In those cases where the measuring devices are of the pneumatic type there is accordingly provided a bank 19 of pneumatic-to-electrical analog converters receiving pneumatic signals from the pneumatic tubes 18 bringing information from the sensing devices in the equipment and converting these to analog electric current signals in corresponding electric lines 18'. These electric analog signals in lines 18' are then converted, by a bank of electric-analog-to-electric-digital-signal converters 19', to digital signals in the corresponding line 18", through which they are transmitted to memory sectors in the computer corresponding to the variables whose values were measured and transmitted through the lines 18. These electrical to digital converters may or may not be contained within the computer.

Some of the telemetered measurement signals are in the form of electric analog signals coming through lines 17; these need only pass through the bank of electric analog-to-digital converters 19' to be impressed as digital signals through the lines 17' upon the memory of the computer.

Similarly, in those cases where the control mechanisms are of the pneumatic type, there is provided a bank 21 of electric-digital-to-pneumatic signal converters between the output transmitting lines 20' of the computer 14 and the pneumatic tubes 20 leading to the pneumatic type controller mechanisms in the chemical apparatus. It will be understood that the bank 21 of converters may carry out the conversion in two stages, first a conversion from digital to electrical analog output, and then from electrical analog to pneumatic output. The digital-to-electrical converters may or may not be contained in the computer. Of course if electronic measuring devices and electronic controlling mechanisms are used, no electrical-to-pneumatic or pneumatic-to-electrical converters are necessary.

It will be appreciated that to trace the individual lines 17, 18 and 20 from the computer to the actual points of measurement and control would tremendously confuse the drawing; instead therefore, the control and measuring lines in the supply and reactor trains 10 and 12 are traced for only short distances from their associated sensing devices and actuators; they are then terminated with one of the symbols "⑰" "⑱" or "⑳" indicating that they are respectively continuations of the lines 17, 18 and 20 leading to the computer. The arrows on these symbols indicate the direction in which information or control signals are being transmitted.

Of course, if electronic measuring devices and actuators are used, no such conversion is necessary. In the drawing, the control and communication lines 17, 17', 18, 18', 18", 20' and 20 are shown as dotted lines to distinguish them from material transport lines; arrows on these lines indicate the direction in which signals are transmitted, i.e., either to or from the computer 14. It is understood that there are many means of transmitting signals from the computer to the control mechanisms such as electrical analog, pneumatic or digital.

Before getting into the details of the operation of the plant, a word on the overall philosophy of the control of this invention will be found helpful. In general, the principle is to set up inside the computer 14 a mathematical model of the entire plant or of such section thereof as is involved in the control required at the moment. For the reactor train, the control model maintains in real time within the computer memory, in an array of memory sectors, hereinafter designated the "- model array" the numerical values of all variables, which relate the current status of the material, in all the reactors which are in the reactor chain.

Thus at any time the computer memory may be interrogated to determine a value which represents the concentrations of any component or value of any other variable or parameter in any given reactor.

The values of these variables are obtained from analog inputs (such as flow rates and densitometer readings), from values entered through the operator's console (such as activator solution strength, target conversion desired and production rate to be maintained), and from values (parameters) calculated in the mathematical models.

At frequent intervals (say 5 minutes; the computer could perform this several times more frequently but this frequency is adequate) the computer performs the manipulations of the mathematical model which comprises the following general steps:

1. A "simulation phase" updates the values in the "model array" to the present conditions of all the variables in all of the reactors which are in service. The values are either actually measured via lines 17 and 18; or entered through the operator's console since the model program went through its last cycle; or values calculated (as in the case of parameters) the last time the mathematical models were carried out.
2. A target rate of reaction is calculated which will achieve the desired conversion when the charge material at the charge end of the reactor chain exits the final available reactor in the reactor chain 12. The existing conditions of desired production rate and the number of reactors in the reactor chain which are considered available for service are considered in these calculations.
3. It calculates from the actual conversion measured by a radiation densitometer 96 at about the middle of the line, and adjusts to a standard temperature (say 0° F.) the average reaction rate prevailing in the reactor line up to the densitometer 96.
4. It then adjusts the numerical value of the activator requirements in the memory section proportional to the discrepancy between the target and actual rates of reaction plus adjustments for relative changes in certain measured or calculated variables (such as soap pH for example).
5. It then performs similar calculations to adjust memory values of certain other variables (feed of supplemented catalyst at 92; temperature of each reactor in the reactor train past the midline of conversion determination) to provide a final trim to the target conversion.
6. Thereafter the computer examines the memory sectors of all of the imposed and assumed operating values, and imposes these, as set points, through the lines 20, upon the mechanically operating control elements of the actual physical plant.

DESCRIPTION OF THE CHEMICAL PROCESS EQUIPMENT EXCLUSIVE OF CONTROL

Initial Reactant
Feed Section 10

This comprises a plurality of pumps 22, 24, 26, 28 and 30 drawing from sources of respectively butadiene, styrene, aqueous soap solution, activator and catalyst as indicated by the legends on the suction lines thereof and discharging through feed regulating control valves 32, 34, 36, 38 and 40. Likewise a source of mercaptan modifier is provided comprising a blowcase 42 pressured with nitrogen and containing the modifier which is discharged through the flow regulating control valve 44. The set points of the flow regulating control valves 32, 34, 36, 38, 40 and 44 are governed by telemetered pneumatic analog signals from the lines 48, 50, 52, 54, 56 and 58 indicated by the symbols '⑳' as extending back at 20 and 20' to the memory sectors in the computer 14 devoted respectively to set points for the feed of butadiene, styrene, aqueous soap solution, activator, catalyst and modifier. All of the flow regulator valves 32, 34, 36, 38 and 44 discharge into a header 60 leading to the intake 62 of the first reactor 64–1 in the reactor bank 12. The catalyst control valve 40 differs from the other valves in that, instead of discharging into the header 60 it feeds through a line 101 into the bottom of the reactor 64–2 in the reactor chain. Actual polymerization does not set in until the catalyst is added, and the first reactor 64–1 is devoted to precooling and mixing the ingredients. Alternatively, the line 101 could lead to any of the first three reactors, depending on the need for precooling. Thus at all times the various ingredients of butadiene, styrene, etc. will be fed into the headers 60 and reactor train 12, each at a rate in proportion to the numerical values currently in the corresponding memory sectors in the computer 14.

Details of
Control Linkages

At this point it will be of interest to digress and consider the details of the linkage between the computer and the materials-flow control actuators upon which it imposes set points. FIG. 2 shows details of the linkage involving the butadiene valve 32. The computer generates its commands in the form of digital impulses in the electrical line 102. These are transmitted to a digital-to-electric-analog converter 104, (one of the bank of such devices indicated at 21 in FIG. 1) which is a conventional device involving a servo adjusted potentiometer which changes its position whenever a signal differing from previous signals is transmitted to it, so as to generate a DC current in the line 106 proportional to the value of the digital signal. This in turn actuates an I/P cell 108, which is a conventional device which generates pneumatic pressure in the pneumatic line 48 proportional to the DC current in the line 106. This pneumatic pressure is transmitted via the line 48 to a flow rate controller 108. In the butadiene supply line 110 there is provided a flow measuring orifice 112, the pressure drop across which activates a D.P. Cell 114 which is a conventional device which generates a pneumatic pressure in the line 116 proportional to the square root of the butadiene flow in the line 110 and transmits this pneumatic pressure through lines 118, 119 to the flow regulator controller 108. This flow regulator controller compares the set point imposed by the line 48 with the flow indicated by the pressure in the line 118, 119, and if they are discrepant, changes the air pressure in a line 122 leading to the actuating diaphragm 124 of the valve 32, in such sense as to increase the butadiene flow if this is indicated to be deficient or to decrease this flow if excessive. Thus the flow of butadiene in the line 110 should follow reasonably closely the value demanded by the original digital control signal generated at 102 by the computer 14.

However, the flow through the valve 32 may not follow the control signal exactly. Accordingly, in order that the computer may be informed of the actual flow, the flow signal line 118 branches to the return information line 49 which goes to an I/P cell 126 which converts the pneumatic flow signal to a DC electric current in the line 128 proportional to the pneumatic signal. The current in the line 128 is converted by an analog to digital converter 129 into a digital electric signal in a line 130 and transmitted to an appropriate sector of the memory 132' in the computer. It is this sector of the memory to which computer will refer for the value of the flow of butadiene in conducting calculations as hereinafter described. Calculations conducted by the computer will thus all be based upon actual values of flow, etc. as reported by the sensing device, rather than upon the values of set points imposed.

It will be understood that the same general system is applied to all of the control actuators in the system, for control materials flow; i.e., for each of the valves 34, 36, 38, 40, 44 (and also 78 not yet mentioned) there will be respectively pneumatic control lines 50, 52, 54, 56, 58 and 79 similar to line 48 for valve 32; back-reporting lines 51, 53, 55, 57, 59 and 81 similar to line 49 for valve 32; and associated actuating and measuring equipment similar to that shown for valve 32 in FIG. 2.

The Reactor Bank 12

This comprises a series of reactors 64–1, 64–2, –3, –4 and so on down to 64–21, of glass-lined steel or other corrosion-resistant construction. Each of the reactors is provided with a rotary stirrer 66 and a cooling coil 68 to which cold methanol is admitted through a temperature regulating control valve 70 which is governed by the temperature reigning inside of the reactor, so as to admit cold methanol whenever the temperature in the reactor rises above the set point for the instrument. These auxiliaries are shown sketchily in FIG. 1 for reactor 64–2, and more in detail in FIG. 3 and 4 discussed below; it will be understood that each of the reactors 64–1 to 64–21 will have a temperature control of this general sort. The set point for each of the instruments is received from the computer, and the actual temperature of the reactor contents transmitted back to the computer as analog input. The temperature controls on the reactors up to the midline point are controlled by a common pneumatic analog control line 46, i.e., it is attempted to keep the temperatures in these reactors all at the same level; and the true temperature of the contents of each individual reactor is transmitted back to the computer via a resistance thermal detector signal line 47 as described in connection with FIG. 3 hereinbelow. Reactors 64–11 to 64–21 each have an individual direct digital control for temperature as described in connection with FIG. 4. By direct digital control it is understood the computer sends an electrical signal which is transduced to pneumatic and applied directly to the control valve, thus bypassing the conventional local controller. It will also be noted in FIG. 4 that an independent temperature system is provided which records individual reactor temperatures and is useful in controlling individual reactors in emergency circumstances when the computer is not in control.

Reverting to the flow of materials, each reactor in the series is connected at its top to a pipe 72 leading to the bottom of the next reactor in the series; thus the ingredients introduced into reactor 64–1 at 62 are directed to pass successively through the reactors 64–1, 64–2, 64–3 and so on and ultimately down to reactor 64–21. The reactants polymerize progressively during their passage together through the reactors, the end product coming from the discharge pipe 74 at the top of the last reactor 64–21 being a latex of a copolymer of butadiene and styrene containing greater or less proportions of unreacted monomers. Typically at this point it will be desired to have about 60 percent of the butadiene reacted to form a copolymer and the remaining portion of 40 percent still unpolymerized; hereafter this will be regarded as the target conversion desired, although it will be understood that greater or lesser conversions could be set up as targets. The latex passes through the pipe 74 to a junction 76 at which a shortstopping agent is injected through a line 78 to stop all further polymerization and the killed latex is then passed through a line 80 to the monomer flash-off tanks and finishing equipment of the plant, none of these latter items being shown. The rate of flow of the shortstop is under control of the computer to the extent necessary to kill the reaction.

Radiation densitometers 96 and 94 are provided in the line 72 just ahead of reactors 64–11 and 64–13 respectively, and transmit this information to appropriate memory sectors in the computer 14. Two densitometers have been provided to impart flexibility to the operation. Normally densitometer 96 is in service and densitometer 94 idle; however, if is desired to perform maintenance on densitometer 96, densitometer 94 may be used in its place.

The last few reactors 64–11 to 64–21 have individual temperature controls 47. The temperatures are controlled individually, based upon mathematical models in the computer such that the latex in each individual reactor will achieve target conversion when it exits the final reactor at 80. This temperature control serves to correct any errors that may have occurred in the previous conversion control models. The temperature control consists of three parts: first a feed-forward portion based upon information obtained at the midline densitometer 96 that determines the temperature requirements of the latex currently at the midline point; secondly a compensation or correction applied to each reactor that corrects for possible poor response of the reactor temperatures to a temperature set point change; and thirdly a feedback correction based upon the error between the conversion measured at the end-of-line densitometer 102 and the target conversion. The feedback portion of temperature control in effect corrects for errors which may have occurred in the feed-forward portion of the temperature control.

A metering pump 92 is provided for injecting additional catalyst at a point between the midpoint of the train and the end thereof to reactor 64–14. The stroke of this pump is under the control of the computer 14 via a control line 86. The purpose of the metering pump 92 is to inject additional catalyst if the computer mathematical models determine that the reaction will not achieve the target conversion due to imbalance of the ratio of catalyst and activator notwithstanding the theoretically correct charge injected by the regulated feed section 10.

Referring now to details of the temperature controls for the reactors, and first to FIG. 3 showing reactor 64-2 which is typical of the early reactors in the line, namely reactors 64-1 to 64-10; as shown, the control comprises the pneumatic line 46 common to all of said early reactors and carrying a temperature set point pressure signal generated by the computer, which line 46 is connected by a branch 119 to a temperature recorder and controller 124. A temperature measuring bulb 120 is immersed in the contents of the reactor, and transmits the temperature in the reactor through the capillary tube 122 to the temperature recorder and controller 124. This temperature recorder and controller compares the temperature indicated via the capillary 122 with the pneumatic set point pressure received via the branch line 119, and if the temperature indicated via the capillary 122 is greater than indicated by the set point, the controller 124 alters the air pressure in a line 126 going to the diaphragm 128 on the valve 70 in such sense as to increase the flow of cold methanol through the valve 70 into the cooling coil 68 immersed in the contents of the reactor thereby lowering the temperature of the reactor contents. Conversely, if the temperature indicated via the capillary 122 is lower than the set point temperature, the controller actuates the valve 70 to decrease the flow of cold methanol, whereby the heat of reaction is permitted to raise the temperature of the reactor contents. In this way, the temperature of the reactor is kept closely equivalent to the value present in the corresponding memory sector of the computer 14.

The actual temperature in the reactor will be subject to excursions, and in order that the true temperature may be at all times communicated to the computer, there is provided a resistance thermometer element 130 inside the reactor which generates an electrical analog signal in the line 47 which is transmitted as indicated at 17 to the appropriate memory sector of the computer 14.

Figure 4:
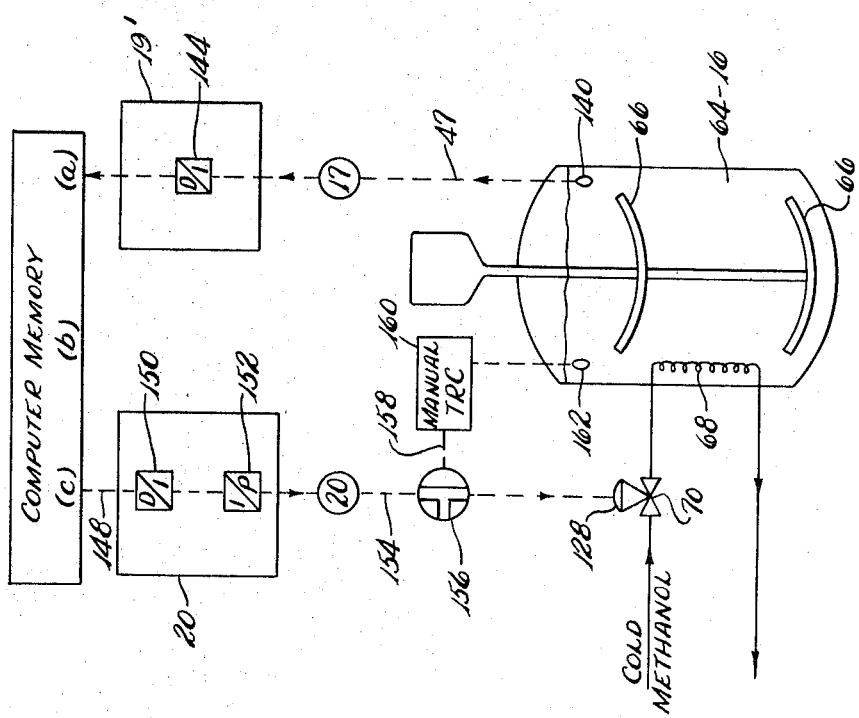
FIG. 4 is a diagram for a direct digital control of the temperatures in the later part of the reactor train.

The temperatures in each of the later reactors in the train, viz. 64-11 to 64-21 are individually controlled by a semidirect digital control as shown in FIG. 4, which is typical for all of these reactors. In FIG. 4 is shown the reactor 64-16 having a rotary agitator 66, cold methanol valve 70 and cooling coil 68 similar to the arrangement in FIG. 3. The temperature prevailing in the reactor is measured by a resistance thermometer 140, transmitted as an electric analog signal through the line 47 to an analog/digital converter 144 which transmits corresponding digital signals to a memory sector (a) in the computer. There is in the computer a temperature set-point memory sector (b) containing the temperature desired in the reactor and also a further memory sector (c) which sends out (via the line 148, digital-to-electric-analog converter 150 and electric-analog-to pneumatic pressure converter 152, through the line 154) to the diaphragm 128 of the valve 70, a pneumatic pressure corresponding to the number in the memory sector (c). The computer periodically compares the memory sectors (a) and (b). If the temperature in the reactor as recorded in memory sector (a) is higher than the desired value in memory sector (b), the computer changes the memory sector (c) in such sense as to open the valve 70 wider and to cool off the batch. Conversely, if the temperature in the reactor is too low, the valve 70 will be cut back so as to allow the heat of reaction to increase the temperature in the reactor 64-16. Thus the reactor temperature will be at all times kept approximately equivalent to the numerical value in the memory sector (b), and a continuously up-dated value of the actual temperature in the reactor will always be present in the memory sector (a). It will be understood that each of the reactors 64-11 to 64-21 will be provided with its own independent system similar to that described above; each reactor will be temperature controlled in accordance with its own respective individual temperatures set-point memory sector independently of all of the other reactors.

THE MATHEMATICS AND PROGRAMMING OF THE COMPUTER 14

As noted above, at stated intervals (conveniently every 5 minutes and this will be assumed hereafter) the computer begins a cycle, the first portion of which is a simulation routine whereby changes, since the last simulation, in important variables at various points in the reactor train which cannot be directly measured are calculated (a) from the balance of materials entering or leaving a given reactor plus (b) the theoretical rate of generation or degeneration of the variable in question during its residence in the reactor. The following equation is fundamental to the simulation:

$$\frac{dx_{i,n}}{dt} = \frac{F}{V}(x_{i,n-1} - x_{i,n}) + \left(\frac{\partial x_{i,n}}{\partial t}\right) \quad (1)$$

where $x$ = a process variable, e.g., concentration, conversion, etc.

$i$, as the first subscript of $x$, signifies that this is the $i$th of I variables $n$, as the second subscript of $x$, means that this is the value of this variable in the $n$th one of the reactors on the line—thus $x_{i,1}$ means the value of $x_i$ in the first reactor 64-1 etc.

$F$ = total volumetric flow rate $V$ = volume of the $n$th reactor $t$ = time difference under the reaction conditions ($\delta x_{i,n}/\delta t$) = overall rate of generation or degeneration of $x_{i,n}$ under the conditions obtaining in the $n$th reactor In equation (1), the first item on the right-hand side will be seen to be purely the result of materials balance. The second item on the right represents the generation or degeneration of the variable $x_{i,n}$ (e.g., the increase in conversion, or some mathematical representation of the thermal history of the material in the $n$th reactor such as "HDT," a concept which will appear below; this second term may be a more or less complicated function of several variables—temperature, residence time in the reactor, conversion, etc. In the simulation subroutine, for convenience, since the form thereof is identical for all variables, the computer first runs down all the variables and corrects their values solely for materials balance since the last simulation, by a routine which, in terms of Fortran, would go as follows, assuming (as will be seen below in Table II) that 24 variables are to be tracked, that we have all 21 of our reactors on line and that the time since the last updating and simulation was 5 minutes:

TABLE I

DO1OI=B1, 24
DO1ON=B1, 21
10 X(I,N)=X(I,N)+(F/V)* (X1,N−1)−X(I,N))*5.0 The notation is the same as for equation (1) except that capital letters must be used in place of lower case letters. This subroutine evaluates the first term of equation (1) 24×21 times—in parallel for each of the 24 variables and in series for each of 21 reactors. In the claims hereafter the sequence of operations will be expressed in terms of the FORTRAN programs of Tables I and II. However, it will be appreciated that the updating cycle interval of 5 minutes is merely chosen for convenience and that other time intervals could be used; accordingly, for generality, the time interval factor "5.0" in these equations will be expressed as "DTIME" in the claims. Likewise the assumption of 21 reactors are on line is purely arbitrary and accordingly the index 21 for N on the DO loop is replaced by the symbol "NUMBER" in the claims. Also, for simplicity, the claims will consider only the modification of one variable at a time, say the concentration, so that the double-subscripted variable X(I,N) need only be a single-subscripted variable X(N); and the first "DO" statement of Table I may be omitted. So condensed, the program of Table I appears in the claims as follows:

TABLE I-A

```
DO 10 N = 1, NUMBER
10 X(N) = X(N)+(F/V)*)X(N−1)−X(N))* DTIME
```

After execution of the program of Table I, the simulation subroutine then passes on to those variables for which the second term of equation (1) is not zero. For instance, there has been developed in connection with this invention a "thermal history" figure "HDT" which is associated with the latex stream at any point, such that:

$$HDT = \int Hdt \qquad (3)$$

where
$H = 2^{T/18}$, a factor serving the purpose of temperature adjustment roughly in accordance with the Arrhenius equation
$T$ = temperature in the reactor in degrees Fahrenheit
$t$ = time of subjection of the reactants to temperature $T$ This quantity HDT may be considered as the total reaction time which the latex has undergone, referenced to 0° F. This quantity is blended forward with the flow in accordance with the subroutine of Table I above. It is then further updated for generation as well as mixing by a subroutine represented as follows:

TABLE II

```
DO 11 N = 1, 21
H(N) = 2 ** (T(N)/18)
11 HDT(N) = HDT(N) + H(N) * 5.0
```

The "5" in statement 11 represents the 5 minutes elapsing since the last simulation cycle updating. The various T(N)'s in the second statement were of course present in memory by report from the temperature sensing elements 130 in the field via the lines 17. Similar further corrections are made in all other variables for which, in equation (2) above, the second term on the right-hand side is not zero, this being in accordance with common methods of numerical integration. Certain of the claims will be directed to the updating of HDT alone, without consideration of other variables. In such case HDT(N) is a specific instance of X(N) of Table I-A, and for the purpose of the claims HDT in Table II is replaced by X(N); and again the time interval of 5.0 minutes is replaced by "DTIME"; and the number of reactors is expressed as "NUMBER" instead of "21." So condensed, the program of Table II is as follows:

TABLE II-A

```
DO 11 N = 1, NUMBER
H(N) = 2 ** (T(N)/18)
11 X(N) = X(N) + H(N) * DTIME
```

As stated above HDT is updated by first updating for materials balance by executing Table I (simplified as I-A) to update HDT for materials balance and then executing Table II (simplified as Table II-A) to update HDT for generation in the reactors.

An exemplary preferred machine-language program for updating the variables for materials balance in accordance with Table I is given hereafter in Table IV, and a similar machine-language program corresponding to Table II is given hereinafter in Table V.

The above is the general type of routine used for the summations and integrations to be discussed below, and, for brevity, the methods of programming will be taken for granted and the process discussed in terms of mathematics apart from programming.

A tabular summary of the channels available in the computer 14 for simulation and tracking, and of the variables simulated and tracked, is given herewith in Table III.

TABLE III

1. Butadiene impurity 01
2. Butadiene impurity 02
3. Butadiene impurity 03
4. Butadiene impurity 04
5. Modifier
6. Activator
7. Soap (parts)
8. Soap pH
9. Butadiene impurity 06
10. Styrene impurity 02
11. Percent oxygen in butadiene vapor
12. Reactor rate
13. Density of stream entry reactor 64–1
14. Reducing power of activator solution
15. Styrene impurity 03
16. Calculated conversion
17. DT (reaction time up to reactor in question)
18. HDT—temperature history referenced to 0° F.
19. Catalyst
20. Unused
21. inch
22. inch
23. inch
24. inch
25. inch
26. inch
27. Midline conversion of latex post reactor 64–10
28. HDT*
29. Midline catalyst blended to end of line
30. Incremental catalyst parts from 90

Some of these are used in the computer routines described below, and others are simply recorded for analysis of the system and possible inclusion in future, more refined, calculations.

Having completed the simulation subroutine, the computer then goes on to decide on any adjustments to be made, as follows:

A. Control of Activator Flow at 38

| | |
|---|---|
| I. | The temperature in all the first reactors 64–1 to 64–13 is assumed to be 42° F. |
| II. | The temperature in the later remaining reactors is assumed to be 44° F. |
| III. | Holdup time per reactor ($\tau$) is at target production rate levels. |
| IV. | Assume initially, and adjust on each successive 5minute cycle, a reaction rate until the conversion projected according to the steady-state conversion equation, is equal to target conversion. To this end the computer first evaluates the equation. |

$$C_s = \sum_{n=2}^{21} R_T * H_n * \tau_n * X_n \qquad (4)$$

where
$n$ as a subscript indicates the particular reactor in the indicated summation
$C_s$ = the projected final conversion
$R_T$ = the target basic rate of conversion, referred to 0° F.
$H$ = the temperature correction factor $2^{T/18}$ defined before
$\tau$ = holdup time in the reactor in question
$X_n = (70 - C_n/20)$, a factor compensating for degree of conversion attained already
$C_n$ = conversion in the $n$th reactor V. The computer then corrects $R_T$ for the *next* trial (5 minutes later) by substituting the value of $C_s$ calculated per equation (4) in the following equation $$R_{Tnew} = R^*_{Told} \frac{60}{C_s} \qquad (5)$$

the numerical value "60" in equation (5) is usual value of the management-dictated percentage conversion; this could, of course, be some different figure. The $R_T$ soon converges on the correct rate of reaction which the latex at the first actively polymerizing reactor 64–2 will require to maintain target conditions when it arrives at the end of the line.

VI. The machine next determines what activator level the latex at the reactor 64-2 will require to maintain the target rate of reaction. In order to do this, the computer has previously calculated the apparent current reaction rate up to the midline by the equation.

$$r_{ML} = C_{ML} \bigg/ \int_{\text{reactor 64-2}}^{\text{reactor 64-10}} H\,dt \qquad (6)$$

wherein $r_{ML}$ = apparent reaction rate up to midline, referenced to 0° F.

$C_{ML}$ is the actual conversion, at midline, measured by the densitometer 96, and the integral expression is that of equation (3).

The machine then determines what activator level is required to maintain the target rate of reaction ($R_T$ per convergence of equations (4) and (5) above) by the equation.

7. $Ao = AML*(R_T/r_{ML})$ wherein $Ao$ = level of activator required to come from the feed line 60

$AML$ = activator level at midline, previously determined in the simulation routine From $Ao$ and the throughput, the computer calculates the rate of flow of activator required through the valve 38, and inserts this value in the memory sector which governs the set point of valve 38. This completes the adjustment of activator supply, which is the initial and principal control maintained by the system of this invention.

While the invention has been described as controlling the reaction by the feed of activator, it will be appreciated that the control could also be exercised for other variables, e.g., soap concentration, catalyst feed concentration, etc.

B. Control of Temperatures in the Past Midline Reactors

At the midline densitometer 96 the first opportunity arrives to determine the conversion and calculate the rate of reaction. Using this information, the computer will calculate the temperature that the latex at the effluent of the reactor 64-10 will require to maintain target conversion when this latex exits at 80 many hours later. 5 minutes previously (for example) the latex may have required a different temperature due to a different rate of reaction. This is handled through the materials-balance portion of the simulation subroutine. This enables us to track the temperature requirements in real time, and provides, by interrogating memory, the temperature requirements in each reactor from midline to the end-of-line reactor.

To determine the temperature requirements of the latex at reactor 64-11 and later reactors the computer employs a trial-and-error solution; first assuming a temperature and using the steady-state form of the conversion equation (4) to determine what the conversion will be on exiting at 80.

I. The computer assumes a value $H_s$ for the reactor 64-11, then evaluates the equation.

$$C_s = \sum_{\text{reactor 64-11}}^{\text{reactor 64-21}} r_{ML}*H_s*\tau*X_n + C_{10} \qquad (8)$$

wherein $r_{ML}$ is the midline value of reaction, determined per equation (6) above referenced to 0° F.

$\tau$ = holdup time per vessel in hours

II. The computer then corrects $H_s$ for the next trial (5 minutes hence) by the equation.

$$H_{s_{new}} = H_{s_{old}}^* \left(\frac{60 - C_{ML}}{C_s - C_{ML}}\right) \qquad (9)$$

where $C_{ML}$ is the measured conversion calculated from the reading of the midline densitometer 96. "60" is the desired target conversion, which could, of course, be some other arbitrary figure. Equations (8) and (9) quickly converge after a few trials on a value of $H_s$ that will give the target conversion 60.

III. The computer then determines the thermal treatment "HDT" of equation

10. $HDT_{Target} = H_s * NO * \tau$ where $NO$ = number of downstream reactors and this is the required future reaction time referenced to 0° F., that the latex in reactor 64-10 must undergo before exiting at 80 in order to obtain 60 percent conversion.

IV. The computer then determines the total, thermal history referenced to 0° F., that the latex must have on exiting at 80, by evaluating the equation.

11. $HDT*(10) = HDT_{Target} + HDT(10)$ wherein $HDT*(10)$ = total reaction time, referenced to 0° F., that the latex must have on exiting at 80 in order to hit target conversion V. The simulator routine blends HDT* associated with the reactor 64-10 downstream into the successive downstream reactors by a subroutine similar to that of Table I, but with the DO loop indexed from 11 to 21, operating on the equation.

12. $HDT*(N) = HDT(N) + R(HDT*(N-1) - HDT*(N))$ where $R$ = Flow*$\Delta t$/(Volume of reactor $N$+Flow*$\Delta t$)
= volume fraction blended VI. The computer then calculates the temperature requirements of each reactor by the equation.

$$H(N) = \frac{HDT*(N) - HDT(N-1) + DHDT}{NO*\tau} \qquad (13)$$

wherein $HDT*(N)$ = reaction time referenced to 0° F. required for the latex in vessel $N$ $$HDT(N-1) = \int_{\text{reactor 2}}^{\text{reactor N-1}} H\,dt = \text{total reaction time, referenced to 0 °F., that the latex in reactor } N-1 \text{ has been subject to}$$

$NO$ = number of vessels remaining in which to trim temperatures $\tau$ = holdup time per vessel, hrs.

$DHDT = \dfrac{60 - C_M}{r_{80}*X_{80}}$ a feed-back connection for the fact that the feed-forward model is in error $C_M$ is the final conversion measured at densitometer 102

$r_{80}$ = reaction rate at the end of the line $X_{80} = X$ as defined in connection with equation (4) applied to the final conversion at 80.

VI. The computer now has stored in memory sectors the required values of H for each of the reactors. These values are then converted to set-point temperatures by the equation.

$$TS(N) = \frac{\ln H8N)}{\frac{1}{18}\ln 2}$$

wherein $TS(N)$ is the set-point temperature for the Nth reactor, and is inserted in the memory sector that controls Nth temperature of the Nth reactor.

This completes the temperature trim portion of the control.

C. Control of Catalyst Addition

Figure 5:
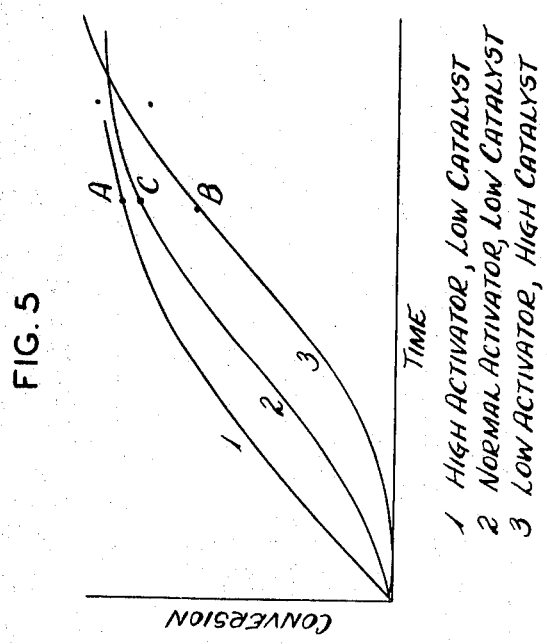
FIG. 5 is a graph showing the effects of proper and improper balance of catalyst and promoter in the reactor.

Referring to FIG. 5, the time-conversion polymerization curve has a different shape under different activator-catalyst ratio relationships. The central curve (2) represents the conversion equations (4) etc. upon which the control of this conversion is based. The simulator routine maintains the calculated conversion in each vessel in memory in real time by the equation.

15. $C(N)=C(N)+R(C(N-1)-C(N))$ (Flow Portion)
16. $C(N)=C(N)+r(N)*H(N)*X(N)*5.$ (Reaction Portion)

manipulated per the simulation routines of Tables I and II above. Thus assuming that the model-calculated conversion at the end of the line is at the point C and the actual conversion as measured by the densitometer is at A, we know that this represents conditions of deficient catalyst and conversely if the measured conversion is at B, we know that catalyst is excessive. If the measured conversion falls on point C, we know conditions are correct.

Bearing this in mind, the catalyst charged at the beginning of the line at 101 is handled on a feedback basis. We have one constraint, namely that the minimum catalyst level for a given activator level should preferably be:

17. $CAT_{Min}=(9.0*A+20.0)A$ where
$CAT_{Min}$ = minimum molarity of the catalyst
$A$ = molarity of the activator At the end of the line:

$$\left(\frac{CAT}{A}\right)_{required} = \left(\frac{CAT}{A}\right)_{end\ of\ line} + G(CC(E\emptyset L) - CM(E\emptyset L)) \quad (18)$$

where $G$ is a constant
$CC(E\emptyset L)$ = calculated conversion at end of line
$CM(E\emptyset L)$ = conversion measured at end of line per densitometer 102 let $X° = \left(\frac{CAT}{A}\right)_{required} \Big/ (9.0\ A8E\emptyset L) + 20)$ (19)

= ratio of requirements to minimum (see eq. 17)

then $CAT(0) = X°*(9.0*A(2)+20)*A(2)$
= required parts of catalyst to be charged at reactor 64–2 where $CAT(0)$ = catalyst required to be charged at 101
$A(2)$ = activator level in reactor 64–2

The computer then changes the set point of the catalyst valve 40 in the indicated ratio.

Incremental Catalyst Added at 92

The amount "XCAT" of catalyst required to force $CC(EOL)=CM(EOL)$ is calculated by the machine sequencing through the equations.

$X_{(E\emptyset L)} = CAT_{(E\emptyset L)}/ACT_{(E\emptyset L)}$ (20)
$X(0) = X_{(E\emptyset L)} + (CC-CM)*G$
64–2
$X_{LL(E\emptyset L)} = (9.0*(ACT)_{(E\emptyset L)} + 20)$
$X°(0) = X(0)$
64–2/XLL(E$\emptyset$L)
$X_{(NXCAT)} = CAT_{(NXCAT)}$
64–14   64–14/ACT(NXCAT)
                64–14
$X_{LL(NXCAT)} = )9.0*ACT(NXCAT) + 20)$
64–14              64–14
$X°(NXCAT)$  $X(NXCAT)$
64–14   64–14/XLL(NXCAT)
$XCAT = [X°(0) = X°_{(NXCAT)}]*X_{LL(NXCAT)}*ACT_{(NXCAT)}$
64–2   64–14   64–14   64–14 (21)

If
$[X°(0) - X°_{(NXCAT)}]$
64–2    64–14

(a) is negative no XCAT is required.
(b) is positive XCAT is required.

$NXCAT$ refers to the reactor where incremental catalyst is to be added.
$X(0)$ refers to the charge at 101.

Thus an error in the CC–CM not only corrects the charge catalyst at 101, but also initiates corrective action by means of incremental catalyst at 92.

A second portion of the incremental catalyst program involves prediction of whether it is possible by temperature trim alone to control the latex at reactor 64–11 to maintain conversion at target when the latex exits at 80. If the temperature is insufficient, within permissible limits (say 40°–48° F.) incremental catalyst is added by increasing the stroke set point for the metering pump 92. THe equations used are End of line $$C_P = \sum_{Reactor\ 64-11} r_{ml} * H_s * \tau * X_n + C_{10} \quad (22)$$

where
$H_s$ is $H$ corresponding to the maximum temperature permissible $(60-C_P)=\Delta$ \quad 23

If $\Delta$ is negative, no further catalyst is required
If $\Delta$ is positive, projected conversion will not reach 60 percent, and additional catalyst must be added per the equation $\Delta XCAT=G(\Delta)$ \quad 24 where
$G$ is a constant
$\Delta XCAT$ is incremental catalyst needed to bring conversion up to target The net of the incremental catalyst subroutine is to calculate the (XCAT) TOTAL to (1) correct both for improper balance of catalyst and (2) make good the inadequacy of feed-forward temperature to maintain target conversion, the sum being $XCAT\ (TOTAL) = XCAT + \Delta XCAT$ \quad 25 the memory sector containing $XCAT$ (TOTAL) is connected through the line 86 to set the stroke of the metering pump proportional to this figure.

D. Miscellaneous Control Loops

Utilizing simulation and target adjustment principles as described in connection with the preceding control loops, the computer makes use of the following equations:

1. Shortstop control at 76.

The shortstop addition is controlled by the valve 78, whose set point comes from the computer via line 79. The shortstop is made proportional to the simulated amount of catalyst by evaluating in sequence the equations:

26. SHORTSTOP (E0L) = CATALYST (E0L)*G
27. Check against a predetermined set of control limits
28. Calculate R value = ratio of calculated parts in Equation (26) to target parts This R value is used to adjust the set point of the valve 78.

2. Modifier

Figure 6:
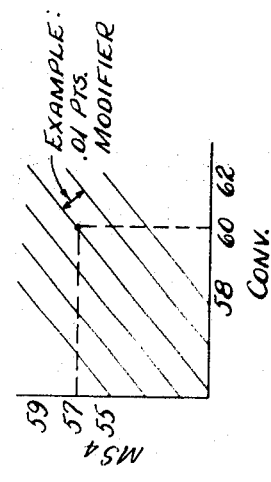
FIG. 6 is a graph showing the relation of conversion and Mooney $ML_4$ viscosity of a typical product at various modifier levels.

The laboratory-determined Mooney MS$_4$ value of the product and the corresponding line conversion are entered periodically (say every 2 hours) via the console keyboard 16. From actual plant experience data a correlation of Mooney MS$_4$ vs. conversion at different levels of modification was determined. FIG. 6 shows the general form of the correlation, the approximately straight lines being contours for various parts of modifier. From the slope of the lines the relationship between MS–4 and conversion is established. In the sequence of equations below, first a conversion is calculated to correspond to the keyboard-entered laboratory MS–4. Next this conversion is compared with the actual conversion that exits in the process. From this an error is established. A portion of the error is combined with the error that existed the last time the MS-4 conversion values were entered. This blended error is used to adjust the present charge of modifier ($M_C$ in equation 32). The sequence of processing the equations is as follows:

29. Calc. conv. = (Lab. MS-4 $- K_1$)*$G_1 + K_2$
30. $E$ (error) = (Lab. conv. $-$ calc. conv.)
31. $E_n = (E_o - E)*G_2 + E_o$
32. $M_c = E_n * G_3$
33. Modifier parts = present modifier charge + $M_c$
34. Check modifier parts against control limits
35. Calculate: $R$ = calculated parts (in (33))/target parts
36. This $R$ is used as basis for the calculations of the set points for output to the control mechanism 3. Production Rate Changes Each type rubber has its own recipe. The amount of each component of the recipe is shown in reference to 100 parts of pure monomers. The base rate of each charge stream shows a volume to be charged that is compensated for impurities.

The rate of charging all of the component streams takes as its reference base the time it takes to fill 12 reactor vessels when charging all streams at their base rate.

The "thpt. factor" (Eq. 43) shows how many times the base rate volumes of all streams that is desired to be charged to the line. The required production determines the thpt. rate charged. Following is the sequence of calculations:

37. Base rate = (parts/100 parts monomer)/(purity) (lbs./gal.)
38. Base parts = the parts at which the base rate is calculated
39. Target parts = desired parts of that individual stream to be charged
40. GPMBI = target base rate = (base rate/base parts)* (target parts)
41. Volume factor constant = 12(3750)/60 (0.95)= 789.474 (cold rubber recipe) = 12.5 (3750)/60 (0.95)=822.368 (hot rubber recipe)
42. GPMT (g.p.m. total) = volume factor constant/actual throughput $$\text{Thpt. factor} = GPMT \bigg/ \sum_{\text{all charge streams}}^{GPMBI} \quad (43)$$

44. GPMI (g.p.m. for individual stream) = (thpt. factor)* (GPMBI)
45. Seconds calibration = seconds factor/GMPI
46. Chart settings = GPMI/chart set factor In the foregoing equations 26–46:
   $G_1, G_2, G_3$ = gain factors
   $K_1, K_2$ = constants
   $M_c$ = change is modifier parts since last calculation
   $E_o$ = old error
   $E_n$ = new error
   EOL = end of line A specific machine program for carrying out the operations above described on the TRW-330 machine is given in Tables IV and V. As will be obvious from the various tables to follow, octal notation is used in the designation of memory sector locations and in the data in the memory sectors, the latter being scaled to $2^{110}$. Table IV is a dump of tracks 200, 201, 202 and 205, of the machine which contain the status model up-dating program: the initial instruction for this portion of the program is on track 200, at sector 162 as indicated by an asterisk at the instruction in question. This program blends each variable forward in the reactor chain in real time. Table V is a dump of track 213 and contains the reaction program which calculates adjustments to be made on the basis of the status model. The initial instruction is at memory sector 0, as indicated by the asterisk in the table. Both of these programs use the known operation instruction codes of the TRW-330 machine.

Table VI is a dump from tracks 305 to 307 and 310 to 312, containing typical values for the tracked parameters in each of the reactors 64-1 to 64-21. Table VII is a memory map of these tracks, and Table VIII is a glossary of the abbreviations and terms used in Table VI.

Table IX is a dump from track 43, which accepts the telemetered input coming from the field via the lines 17' and 18'' and also contains (together with track 54, Table XII) control set points read out via the lines 20'. Table X is a memory map of track 43. As indicated on the table, sectors 0-24 contain the current temperatures of the reactors as telemetered in from the field. Sectors 40-53 contain set points which are calculated by the program of Tables IV and V and imposed on the temperature controls for the indicated reactors. Sectors 56-64 and 71-77 contain input data telemetered from various instruments in the field as indicated by reference characters, or in the absence of reference characters, manually entered from analytical data via the keyboard 16. The values in these sectors are in terms of centivolts, not yet converted to actual values of flows etc. In order to get values averaged over the 5-minute cycle, the values are read in from the field each minute and added up in these registers to provide values proportional to the average over the 5-minute cycle. The even-numbered sectors from 120 to 136 contain flow control output data for the various ingredients in terms of "R values" calculated by the program section from the input data and the desired flow of each of the indicated ingredients (butadiene, styrene, etc.) these "R values" for each ingredient being multiplied by the corresponding "target parts" for that ingredient appearing in Table XII, track 54 even-numbered sectors 160-176 and the product applied as a set point upon the flow rate controller for that ingredient through an appropriate one of lines 20'. The remainder of the memory sectors in Tables X and XII are values of the indicated variables either calculated from the input data for intermediate use and/or logging by the program sector, or analytical or base rate requirements entered via the keyboard 16.

TABLE VIII

BLENDED VARIABLES FOR EACH REACTOR

1. Bd 1—butadiene impurity peak from chromatograph
2. Bd 2—butadiene impurity peak from chromatograph
3. Bd 3—butadiene impurity peak from chromatograph
4. Bd 4—butadiene impurity peak from chromatograph
5. Modifier
6. Activator
7. Soap parts
8. Soap pH
9. Bd 6—butadiene impurity peak from chromatograph
10. Sty 2—styrene impurity peak from chromatograph
11. % $O_2$—percent oxygen
12. Rate—reaction rate (conversions/hour) at 0° F.
13. P.C. Density—pre-charge density
14. R.P.—reducing power of activator
15. Sty 3—styrene impurity peak from chromatograph
16. Conv—calculated conversion
17. DT—reaction time (hours)
18. HDT—reaction time (hours at 0° F.)
19. CAT—Catalyst
20. 0—space reserved for new variables
21. 0—space reserved for new variables
22. 0—space reserved for new variables
23. 0—space reserved for new variables
24. 0—space reserved for new variables
25. 0—space reserved for new variables
26. 0—space reserved for new variables
27. IO CONV—reactor 64-10 conversion
28. HDT*—HDT desired when midline latex gets to end of line
29. IOHDT—reactor 64-10 HDT
30. XCAT Pts—incremental catalyst parts added at 92

In the foregoing description, reference has been made in general terms to catalysts, activators, modifiers, etc. In general, the catalysts are free-radical yielding compounds, the activator ingredients are valence-changing metal compounds suitable as redox components, and the modifiers are mercaptan-type compounds, all well known in the art. While the invention has been illustrated in connection with the emulsion copolymerization of butadiene with styrene, it will be understood that the system could be applied to the polymerization of any of a wide variety of monomers, both to form homopolymers or copolymers of one or more of the monomers such as the various conjugated diolefins such as butadiene, isoprene, 2,3-dimethylbutadiene, piperylene and the like; styrene and its homologs such as alpha-methyl styrene, the vinyl toluenes, and the like; acrylic compounds such as acrylonitrile, methacrylonitrile, acrylic and methacrylic acid and esters such as methacrylic acid, ethyl acrylate and the like; and vinyl and vinylidene compounds such as vinyl chloride, vinyl acetate, vinylidene chloride, and the like. Likewise the system is not confined to emulsion polymerization, but may also be applied to suspension and solution polymerization, and using other than free radical catalysts, for instance, anionic and cationic catalysts such as lithium and other metal alkyls, Ziegler catalysts, Friedel-Crafts catalysts and the like. It will also be understood that not all of the controls disclosed herein need be exercised simultaneously; for instance, a very good approximate control may be had with the activator loop alone, although it cooperates in a particularly excellent way with the final temperature trim and catalyst control routines. In such case, the other controls would be left to manual manipulation by the operator, on the basis of his own judgment, aided in some cases by values of the various parameters which can be read out from the computer 14. Likewise various combinations of two or more of the controls—say activator and final temperature trim of the post-midline reactors—can be controlled by the computer and other adjustments left to manual control by the operator.

From the foregoing general discussion and detailed described embodiment of the invention, it will be evident that there has been provided a process and system of control for polymerization systems which will operate with a minimum of skilled supervision, will hold the output properties closely to target, and will make progressive adjustments along the line as disturbances are propagated therealong. The system also makes fullest use of all equipment available, and avoids the cutting out of portions thereof for control purposes.

I claim:

1. In the operation of a train of stirred reactors wherein polymerizable process material is continuously supplied to the first reactor in the train, each successive reactor is connected to continuously discharge its contents of process material into the next succeeding reactor in the train, polymerized process material is continuously discharged from the last reactor in the train and a programmed digital computer is connected to receive signals corresponding to values of process variables in said reactors, the method of determining the value of a process variable "X" in each reactor as that variable changes in that reactor as the result of material balance in the reactor train, said method consisting in the following steps:
generating and storing into memory sectors of a digital computer digital signals corresponding to numerical values of said process variables in the successive reactors and also storing numerical values of other parameters hereinafter tabulated, said numerical values and corresponding memory sectors being designated as follows, in FORTRAN notation

| Designation of Memory Sector(s) | | Value(s) Stored |
| --- | --- | --- |
| X | | is a process variable |
| N | = | a subscript, indicating that the variable stored is the value of that variable in the $N^{th}$ one of the reactors in the train |
| NUMBER | = | the total number of reactors in the train |
| DTIME | = | length of time selected for the interval between updatings of the variables |
| X(N) | = | as a member of an array of subscripted memory sectors one for each reactor, the value of the variable X in the $N^{th}$ reactor in the train |
| F | = | the volumetric flow rate in the reactors in the train |
| V | = | volume of the $N^{th}$ reactor |

Storing in the memory of said computer a machine-language program corresponding to the following FORTRAN program
DO 10 N=1, NUMBER
10 X(N)=X(N)+(F/V)*(X(N−1)−X(N))*DTIME
Causing said computer to periodically execute said program at intervals of time DTIME, thereby at each execution of the program generating updated digital signal values of the variables formerly stored in the array of memory sectors, and storing said updated signal values back in the array of memory sectors X(N) in place of the digital signals present in the array of memory sectors at the beginning of that execution.

2. Process according to claim 1, wherein the variables X(N) are more particularly concentrations of a component of the polymerizable process material in the several reactors.

3. Process according to claim 1, wherein the values of process variables stored in the array X(N) are more particularly values, in the several reactors, of a thermal history parameter, hereinafter designated "HDT" of the polymerizable process material such that
$$HDT = \int H dt$$
wherein
$H = 2^{T/18}$
T = temperature
t = time of subjection of the polymerizable process material to the temperature T
wherein the following further steps are periodically performed measuring the temperature in each reactor, generating a digital signal for each temperature so measured proportional to said temperature, and storing the digital signals together with other digital signals in memory sectors of said digital computer designated as follows, in FORTRAN notation

| Designation of Memory Sector(s) | Value(s) Stored |
| --- | --- |
| X(N) | as a specific instance of X(N) referred to in claim 1, and as a member of an array of subscripted memory sectors, one for each reactor, the value of HDT for the contents of the $N^{th}$ reactor in the train |
| T(N) | as a member of an array of subscripted memory sectors, one for each reactor, the value of the temperature in the $N^{th}$ reactor in the train | storing in the memory of said computer, in addition to the program set forth in claim 1, a further machine program corresponding to the FORTRAN program

```
    DO 11      N = 1, NUMBER
    H(N)       = 2 ** (T(N)/18)
 11 X(N)       = X(N) *DTIME
``` causing said computer to periodically execute the above program at intervals of time DTIME, in addition to executing the program of claim 1 to update the values of X(N) for materials balance, thereby at each execution of the programs generating digital signal values of X(N) updated additionally for generation in the reactors, and storing said additionally updated signals back in the array of memory sectors X(N) in place of the digital signals stored in the array of sectors at the beginning of that execution.

4. Process according to claim 3, wherein the rate of flow of activator to the first reactor in the train is controlled in response to digital signals generated and stored in accordance with the process of claim 3, the further steps which consist in conducting upon these digital signals the summation $$C_s = \sum_{n=2}^{Number} R_T^* H_n^* \tau_n^* X_n \qquad (4)$$

thereafter subjecting these digital signals to the manipulation $$R_{Tnew} = R_{Rold} * \frac{60}{C_s} \qquad (5)$$

thereafter subjecting these digital signals to the manipulation $$r_{ML} = C_{ML} \Big/ \int_{reactor_2}^{reactor_{ML}} H dt \qquad (6)$$

thereafter further subjecting these digital signals to the manipulation $$A_0 = AML*(R_T/r_{ML}) \qquad 7$$

and adjusting the flow of activator proportionally to the finally generated signal $A_0$, the notation of the mathematical expressions hereinabove being as follows:

DTIME = interval of time for each cyclic repetition of the calculations
HDT = the value of the integral as specified in claim 3
NUMBER = number of reactors in the train of reactors
HDT(N) = value of the integral ∫ Hdt for the contents of the $n$th reactor
F = rate of flow of reactants
V = reactor volume
HDT(N−1) = value of the integral ∫ Hdt for the contents of the (N−1)th reactor
T(N) = temperature in the Nth reactor
H = $2^{T/18}$
T = temperature in degrees Fahrenheit
$t$ = *time of subjection of reactants to temperature T*
Equations (II) and (III) are in terms of FORTRAN
N = as a FORTRAN subscript, ascribes the variable which it subscripts to the contents of the Nth reactor in the train of reactors
$n$ = as a subscript, ascribes the variable which it subscripts to the contents of the $n$th reactor in the train of reactors
$C_s$ = the projected final conversion of the monomers charged
$R_T$ = the target basic rate of conversion, referred to 0° F., the sub-subscripts "new" and "old" indicating the value of this target rate before and after the operation indicated by equation (2)
$H_n$ = value of H in the $n$th reactor
$\tau$ = holdup time in the reactor in question
$X_n$ = has the value (70−$C_n$/20)
$C_n$ = conversion in the $n$th reactor
$r_{ML}$ = has the value indicated by equation (2) and is the apparent reaction rate up to midline, referenced to 0° F.
$C_{ML}$ = is the actual conversion, measured at midline, of the reactor train by means of a densitometer
In equation (6), the integral expression was evaluated by computations of claim 7, integrated up to the midline reactor
$A_0$ = value defined by equation (7) applied as a control to the flow of activator

UNITED STATES PATENT OFFICE
CERTIFICATE OF CORRECTION

Patent No. 3,614,682          Dated October 19, 1971

Inventor(s)    Robert C. Smith

It is certified that error appears in the above-identified patent and that said Letters Patent are hereby corrected as shown below:

Col. 8, line 53, "DO101=B1, 24" should read --DO 10 I =1,24-- line 55, "10 X(I,N)=X(I,N)+(F/V)* (XI,N-1)-X(I,N))*5.0 The"
               should read
            --10 X(I,N) = X(I,N) + (F/V)*(X(I,N-1) - X(I,N))* 5.0. The--

Col. 12, line 29, "12. HDT*(N)=HDT(N)+R(HDT*(N-1)-HDT*(N))"
                should read
              --(12) HDT* (N) = HDT* (N) + R(HDT* (N-1) - HDT* (N))--

Col. 12, lines 66-68,    "TS(N) = $\frac{\ln H8N)}{18 - \ln 2}$ " should read

--14    TS (N) = $\frac{\ln H (N)}{18 \ln 2}$ -- line 72, "Nth" should read --the--

Col. 13, line 39, "(9.0 A*EOL) + 20)" should read --(9.0 A(EOL) + 20)-- line 66, ")9.0*ACT(NXCAT)+20)" should read --( (9.0 * ACT(NXCAT)+20)-- line 70, the second "=" should read -- - --

Col. 14, line 54, "(EOL)", both occurrences, should read --(EØL)--

Col. 15, line 41, the "(43)" is at the right instead of to the left.

line 45, "GMPI" should read --GPMI-- line 54, "EOL = end of line" should read --EØL = end of line-- line 60, "scaled to $2^{110}$" should read --scaled to $2^{-10}$ --

Col. 16, Tables IV, V, VI and VII have been omitted

Tables IX, X and XII have been omitted (after line 70)

Col. 18, line 62 "11 X(N) = X(N) *DTIME" should read
           --11 X(N) = X(N) + H(N) * DTIME--

UNITED STATES PATENT OFFICE
CERTIFICATE OF CORRECTION

Patent No. 3,614,682　　　　　　　　　　Dated October 19, 1971

Inventor(s)　Robert C. Smith

It is certified that error appears in the above-identified patent and that said Letters Patent are hereby corrected as shown below:

Column 16, after line 34, insert

TABLE IV
STATUS MODEL PROGRAM DUMP

```
A0200-000
0102 0075-000   0142 0024-000   0056 0117-001   0430 0000-001   0056 0117-001   0242 0024-000   0056 0117-001   0000 0201-077
0000 0200-020   0045 0200-053   0056 0117-001   0051 0200-053   0056 0117-001   0001 0200-060   0056 0117-001   0056 0117-001
0070 0052-131   1042 0017-001   0044 0254-007   0060 0077-000   0000 0201-042   0076 0075-000   0056 0117-001   0142 0024-000
0056 0117-001   0430 0000-001   0056 0117-001   0242 0024-000   0056 0117-001   0000 0201-040   0000 0200-040   0142 0024-000
1025 0334-076   0430 0000-001   0056 0117-001   0242 0024-000   0056 0117-001   0000 0202-136   0056 0117-001   0000 0246-166
0000 0200-050   0000 0200-051   0000 0200-052   0000 0200-053   0000 0213-000   0000 0200-055   0000 0200-056   0000 0200-057
0000 0200-060   0000 0027-036   0000 0021-036   0000 0013-036   0000 0005-036   0000 0000-001   0070 0052-114   0056 0117-001
0000 0254-013   0056 0117-001   0056 0117-001   0056 0117-001   0056 0017-001   0056 0117-001   0056 0117-001   0142 0024-000
0056 0117-001   0042 0025-000   0056 0017-001   0076 0076-000   0056 0117-001   1071 0060-164   0056 0117-001   0142 0025-000
0056 0117-001   0076 0075-000   0056 0117-001   0036 0052-114   0056 0117-001   0020 0051-116   0056 0117-001   0000 0200-123
0056 0117-001   0056 0117-001   0056 0117-001   0044 0200-140   0056 0117-001   0070 0075-000   0056 0117-001   0420 0000-177
0056 0117-001   1065 0200-136   0000 0027-000   0000 0021-000   0000 0013-000   0000 0005-000   0056 0117-001   1242 0025-172
0010 0200-143   0056 0117-001   0054 0204-130   0056 0117-001   0070 0075-000   0056 0117-001   0420 0000-177   0056 0117-001
0036 0052-114   0056 0117-001   1031 0200-157   0000 0000-003   0000 0000-003   0000 0000-003   0000 0000-003   0056 0117-001
0000 0200-011   0056 0117-001   0036 0052-114*  0056 0117-001   0014 0200-171   1036 0076-167   0000 0200-166   0056 0117-001
0044 0200-107   0037 0200-065   0050 0200-001   0422 0000-024   0042 0035-000   0426 0000-001   0030 0077-000   1033 0334-035

A0201-000
0000 0254-007   0056 0117-001   0070 0052-114   0056 0117-001   0430 0000-001   0056 0117-001   0044 0201-014   0056 0117-001
0000 0201-014   0056 0117-001   0000 0200-066   0056 0117-001   0100 0201-016   0056 0117-001   0142 0021-000   0056 0117-001
0020 0201-021   1777 3757-177   0242 0021-000   0056 0117-001   0070 0240-001   0036 0076-000   0000 0240-002   0044 0200-107
0056 0117-001   0050 0200-037   0056 0117-001   0042 0035-000   0056 0117-001   0030 0077-000   1142 0024-040   0102 0075-000
1067 0334-076   0042 0025-000   0070 0052-130   0076 0076-000   0044 0201-145   1142 0024-047   0000 0201-051   0056 0117-001
0430 0000-001   0076 0052-114   0242 0024-000   0000 0201-067   1071 0063-124   0056 0117-001   0056 0117-001   0056 0117-001
1042 0017-001   0056 0117-001   0060 0077-000   0056 0117-001   0076 0075-000   0056 0117-001   0142 0024-000   0470 0200-066
0430 0000-001   0432 0201-107   0242 0024-000   0056 0117-001   0000 0202-076   0056 0117-001   0066 0070-017   1025 0334-135
0100 0110-001   0001 0203-050   0042 1414-020   0036 2060-132   0034 1320-120   0020 1721-131   1032 2650-020   0100 0201-101
0100 0201-102   0020 1710-020   0200 0201-115   0020 2162-020   1200 0201-116   0024 0052-130   0470 0665-076   0470 0665-021
0024 0052-077   0056 0110-012   0056 0110-012   0000 0060-041   0000 0060-041   0036 0076-000   0056 0117-001   0044 0200-107
0056 0117-001   0050 0200-040   1067 0334-174   0042 0035-000   0056 0117-001   0030 0077-000   0050 0200-107   0102 0075-000
0042 0025-000   0056 0117-001   0056 0117-001   0056 0117-001   1071 0061-024   0470 0000-000   0070 0052-077   0076 0052-077
0044 0201-170   0470 0254-007   0430 0000-001   0432 0201-101   0000 0201-157   0000 0201-076   0056 0117-001   0076 0052-077
1042 0017-001   0470 0000-000   0060 0077-000   0076 0055-023   0076 0075-000   0000 0200-066   0000 0202-174   0056 0117-001
0070 0052-131   0056 0117-001   0044 0201-002   0056 0117-001   0470 0000-000   0426 0001-000   0076 0052-131   1025 0334-035
```

UNITED STATES PATENT OFFICE

CERTIFICATE OF CORRECTION

Patent No. 3,614,682         Dated October 19, 1971

Inventor(s) Robert C. Smith

It is certified that error appears in the above-identified patent and that said Letters Patent are hereby corrected as shown below:

Column 16, after line 34 and after Table IV(1st part), insert

TABLE IV (CONT'D.)

A0202-000

| | | | | | | | | |
|---|---|---|---|---|---|---|---|---|
| 0056 0117-001 | 0142 0024-000 | 0056 0117-001 | 0430 0000-001 | 0056 0117-001 | 0242 0024-000 | 0056 0117-001 | 1071 0062-064 |
| 0056 0117-001 | 0056 0117-001 | 0056 0117-001 | 0056 0117-001 | 0056 0117 001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0000 0200-040 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 1036 0076-067 | 0056 0117-001 | 0056 0117-001 |
| 0044 0200-107 | 0056 0117-001 | 0050 0201-175 | 0056 0117-001 | 1042 0035-076 | 0056 0117-001 | 1067 0334-135 | 0030 0077-000 |
| 0056 0117-001 | 0102 0075-000 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 1042 0117-001 | 0056 0117-001 | 0060 0077-000 | 0056 0117-001 | 0076 0075-000 | 0056 0117-001 |
| 0000 0201-132 | 0056 0117-001 | 0056 0117-001 | 0056 0117-001 | 0056 0117-001 | 0056 0117-001 | 1025 0334-174 | 0056 0117-001 |
| 0056 0117 001 | 0056 0117-001 | 0056 0117-001 | 0056 0117 001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 1067 0334-035 | 0042 0025-000 | 0056 0117-001 | 0076 0076-000 |

A0225-000

| | | | | | | | | |
|---|---|---|---|---|---|---|---|---|
| 0000 0200-040 | 0000 0201-177 | 0000 0202-136 | 0000 0201-077 | 0056 0117-001 | 0000 0000-001 | 0000 0000-002 | 0000 0000-004 |
| 0000 0000-010 | 0000 0000-020 | 0000 0000-040 | 0000 0000-100 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0052 0006-000 | 0070 0052-022 | 0420 0001-177 | 0044 0225-057 | 0056 0171-002 | 0000 0225-071 | 0424 0000-025 | 0014 0225-063 |
| 0042 0030-000 | 0000 0225-071 | 0030 0075-000 | 0470 0000-001 | 0050 0115-062 | 0076 0052-022 | 0076 0065-167 | 0000 0225-100 |
| 0052 0006-000 | 0014 0222-042 | 1042 0006-010 | 0000 0225-075 | 0056 0117-001 | 0000 0225-077 | 0056 0117-001 | 0000 0225-153 |
| 0142 0024-000 | 0056 0117-001 | 0076 0063-104 | 0420 0001-177 | 0066 0063-112 | 0056 0171-002 | 0070 0077-000 | 0424 0000-035 |
| 0033 0063-133 | 0042 0030-000 | 0430 0000-012 | 0030 0075-000 | 0842 0025-000 | 0050 0115-062 | 0067 0334-177 | 0036 0065-167 |
| 0000 0225-130 | 0061 0252-145 | 0036 0062-044 | 0242 0025-000 | 0000 0225-071 | 0071 0334-177 | 0056 0117-001 | 0076 0065-167 |
| 0426 0000-002 | 0470 0115-062 | 0071 0334-177 | 0432 0225-141 | 0042 0035-000 | 0066 0070-000 | 0060 0222-137 | 0100 0110-000 |
| 0000 0213-175 | 1200 0225-143 | 0056 0117-001 | 0024 0065-167 | 0056 0117-001 | 0470 0240-073 | 0056 0117-001 | 0056 0110-012 |
| 0056 0117-001 | 0000 0060-041 | 0056 0117-001 | 0054 0225-060 | 0056 0117-001 | 0000 0241-000 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |
| 0056 0117-001 | 0056 0117-001 | 0056 0117-001 | 0056 0117-001 | 0056 0117-001 | 0056 0117-001 | 0056 0117-001 | 0056 0117-001 |

UNITED STATES PATENT OFFICE
CERTIFICATE OF CORRECTION

Patent No. 3,614,682  Dated October 19, 1971

Inventor(s) Robert C. Smith

It is certified that error appears in the above-identified patent and that said Letters Patent are hereby corrected as shown below:

Column 16, after line 34 and after Table IV cont'd., insert

TABLE V

REACTION PROGRAM DUMP

```
A0213-000  *
0436 0000-025  0434 0000-026  0426 0000-001  1212 0075-005  1025 0317-067  0436 0000-025  0056 0117-001  0426 0000-001
0056 0117-001  0142 0025-000  0056 0117-001  0076 0076-000  0056 0117-001  0071 0252-145  0056 0117-001  0460 0000-022
0056 0117-001  0242 0025-000  0056 0117-001  0067 0334-177  0056 0117-001  1070 0076-072  0076 0077-000  0056 0117-001
0033 0334-177  1042 0017-001  0070 0213-033  0031 0000-000  0030 0075-000  0076 0075-000  0050 0213-044  1142 0025-054
0070 0213-041  0000 2000-000  0000 0213-103  0000 0213-047  0070 0213-045  0043 0000-000  0030 0075-000  1042 0017-001
0434 0000-023  0000 0213-054  0212 0213-053  0012 0000-000  0426 0000-004  0460 0000-006  0061 0334-177  0242 0025-000
0077 0334-177  0067 0334-177  0426 0000-001  0066 0305-013  0071 0334-177  0066 0052-135  1032 0213-071  0000 0213-005
1071 0317-116  0000 0125-052  0060 0075-000  0430 0000-014  0077 0334-177  0044 0225-122  0426 0000-001  0036 0076-000
0071 0334-177  0000 0213-007  0060 0077-000  0302 0077-000  0077 0334-177  0056 0117-001  0142 0024-000  0056 0117-001
0242 0025-000  0056 0117-001  0014 0213-002  0056 0117-001  0010 0215-015  0056 0117-001  0054 0215-052  1035 0252-145
0000 0222-003  0056 0117-001  0044 0240-000  0056 0117-001  0000 0222-003  0040 0213-000  0056 0117-001  0056 0117-001
0056 0117-001  0056 0117-001  0056 0117-001  0056 0117-001  0056 0117-001  0056 0117-001  0056 0117-001  0056 0117-001
0056 0117-001  1042 0017-011  0056 0117-001  0056 0117-001  0056 0117-001  0056 0117-001  0044 0213-112  0056 0117-001
0070 0076-000  0056 0117-001  0460 0000-013  1042 0017-001  0042 0025-000  0076 0075-000  0242 0024-000  0142 0025-000
0071 0334-177  0460 0000-004  0044 0213-165  1242 0025-170  0426 1777-175  1142 0024-171  0070 0213-167  0001 1252-161
0302 0077-000  0071 0334-177  0042 0025-000  0302 0075-000  0000 0213-112  1042 0010-003  0056 0117-001  0056 0117-001
```

UNITED STATES PATENT OFFICE
CERTIFICATE OF CORRECTION

Patent No. 3,614,682  Dated October 19, 1971

Inventor(s) Robert C. Smith

It is certified that error appears in the above-identified patent and that said Letters Patent are hereby corrected as shown below:

Column 16, after line 34 and after Table V, insert

TABLE VI
TYPICAL DUMP OF TRACKS 305-7 AND 310-312

```
A0305-000
0000365614  0002153455  0000332100  0000176767  0005624317  0000400001  0002122543  0005200406
0001127047  0001251000  0005243650  0000540575  0004400000  0003652074  0002553465  0000000000
0000000000  0000000000  0000000000  0000000000  0000000000  0000000000  0000000000  0000000000
0000000000  0000000000  0000000000  0000000000  0000000000  0000000000  0000000000  0000000000
0000000000  0000365607  0002153455  0000332100  0000176762  0005624310  0000400001  0002121547
0005202734  0001127047  0001253435  0004645306  0000540575  0004400000  0003652030  0002555646
0001532224  0000164671  0001160027  0017736703  1777777773  1777777773  0000000000  0000000000
0000000000  0000000000  0000000000  0000000000  0000000000  0000000000  0000000000  0000000000
0000365602  0002153455  0000332100  0000176755  0005624260  0000400000  0002121310  0005206267
0001127047  0001257134  0000540575  0000540575  0004400000  0003651764  0002560156  0003031266
0000324334  0002161043  0017735656  1777777766  1777777766  0000000000  0000000000  0000000000
0000000000  0000000000  0000000000  0000000000  0000000000  0000000000  0000000000  0000000000
0002153455  0000332100  0000176750  0005624161  0000400000  0002121072  0005210146  0001127047
0001261427  0004226572  0000540575  0004400000  0003651720  0002560555  0004311723  0000464022
0003150546  0017765621  1777777761  1777777761  0000000000  0000000000  0000000000  0000000000
0000000000  0000000000  0000000000  0000000000  0000000000  0003714631  0000531463  0003665107

A0306-000
0000365571  0002153455  0000332100  0000176743  0005624025  0000400000  0002120750  0005210274
0001127047  0001261657  0004176053  0000542766  0004400000  0003651663  0002557545  0005644272
0000623521  0004204314  0020020557  1777777754  1777777754  0000000000  0000000000  0000000000
0000000000  0000000000  0000000000  0000000000  0000000000  0000000000  0000000000  0000000000
0000000000  0000365571  0002153455  0000332100  0000176736  0005623605  0000400000  0002120656
0005210311  0001127047  0001261320  0004154450  0000542766  0004400000  0003651617  0002556150
0007175163  0000763241  0005225013  0020060515  1777777747  1777777747  0000000000  0000000000
0000000000  0000000000  0000000000  0000000000  0000000000  0000000000  0000000000  0000000000
0000365571  0002153460  0000332100  0000176731  0005623354  0000400000  0002120646  0005210153
0001127053  0001260361  0004146243  0000542766  0004400000  0003651546  0002555045  0010553722
0001122766  0006274070  0020112423  1777777742  1777777742  0000000000  0000000000  0000000000
0000000000  0000000000  0000000000  0000000000  0000000000  0000000000  0000000000  0000401774
0002271633  0000346216  0000163117  0005671451  0000400000  0002131277  0005232217  0001117436
0001330647  0002556520  0000542766  0004400000  0003636507  0002674613  0013220242  0001352113
0007751513  0021150621  1777777731  1777777731  0000000000  0000000000  0000000000  0000000000
0000000000  0000000000  0000000000  0000000000  0000000000  0000000000  0000000000  0000000000
```

FO-1050
(5/69)

UNITED STATES PATENT OFFICE
CERTIFICATE OF CORRECTION

Patent No. __3,614,682__ Dated __October 19, 1971__

Inventor(s) __Robert C. Smith__

It is certified that error appears in the above-identified patent and that said Letters Patent are hereby corrected as shown below:

Column 16, after line 34 and after Table VI, installment beginning "AO 305-000", insert

TABLE VI (CONT'D)

```
A0307-000
0000365571   0002153671   0000332150   0000176720   0005623217   0000400000   0002120712   0005210132
0001127323   0001257750   0004123004   0000542330   0004400000   0003651435   0002556357   0013416241
0001422263   0010337262   0020133222   1777777731   1777777731   0000000000   0000000000   0000000000
0000000000   0000000000   0000000000   0000000000   0000000000   0000000000   0000000000   0000000000
0000000000   0000365612   0002154614   0000332425   0000176730   0005623347   0000400000   0002120744
0005210304   0001130420   0001260730   0004053231   0000542330   0004400000   0003651314   0002562744
0016247561   0001721575   0012377235   0020127641   1777777720   1777777720   0000000000   0000000000
0000000000   0000000000   0000000000   0000000000   0000000000   0000000000   0000000000   0000000000
0000365632   0002155343   0000332630   0000176743   0005623475   0000400000   0002120753   0005210422
0001131270   0001261631   0004022447   0000542330   0004400000   0003651243   0002565720   0017227025
0002061312   0013377373   0020120521   1777777713   1777777713   0000000000   0000000000   0000000000
0000000000   0000000000   0000000000   0000000000   0000000000   0000000000   0000000000   0000000000
0002156304   0000333126   0000176774   0005623645   0000400000   0002120752   0005210555   0001132417
0001262776   0003765475   0000540556   0004400000   0003651172   0002571342   0021372122   0002221030
0014560071   0020105272   1777777706   1777777706   0000000000   0000000000   0000000000   0000000000
0000000000   0017665430   0032254653   0013376324   0000000000   0000000000   0000000000   0000000000

A0310-000
0000365737   0002157507   0000333537   0000177055   0005623776   0000400000   0002120736   0005210711
0001134071   0001264331   0003725514   0000537415   0004400000   0003651121   0002575322   0023034567
0002360545   0015715540   0020067101   1777777701   1777777701   0000000000   0000000000   0000000000
0000000000   0000000000   0017627315   0032323461   0013374724   0000000000   0000000000   0000000000
0000000000   0000366040   0002161167   0000334301   0000177202   0005624045   0000400000   0002120711
0005211035   0001136124   0001266011   0003664111   0000536466   0004400000   0003651050   0002601532
0024477561   0002520264   0017051407   0020046677   1777777674   1777777674   0000000000   0000000000
0000000000   0000000000   0000000000   0017576653   0032372175   0013373206   0000000000   0000000000
0000366172   0002163122   0000335205   0000177404   0005623772   0000400000   0002120651   0005211142
0001140554   0001267561   0003622440   0000535705   0004400000   0003650777   0002606073   0026144544
0002660004   0020205353   0020025122   1777777667   1777777667   0000000000   0000000000   0000000000
0000000000   0000000000   0017553010   0032436677   0013371456   0000206336   0000000000   0000366364
0002165300   0000336254   0000177700   0005623544   0000400000   0002120600   0005211226   0001143600
0001271374   0003562060   0000535215   0004400000   0003650726   0002612472   0027612034   0003017530
0021341370   0020002133   1777777662   1777777662   0000000000   0000000000   0000000000   0000000000
0000000000   0017532246   0032472725   0013370002   0000442021   0000000000   0000000000   0000000000
```

UNITED STATES PATENT OFFICE
CERTIFICATE OF CORRECTION

Patent No. 3,614,682     Dated October 19, 1971

Inventor(s) Robert C. Smith

It is certified that error appears in the above-identified patent and that said Letters Patent are hereby corrected as shown below:

Column 16, after line 34 and after Table VI, installment beginning "A0 307-000", insert

TABLE VI (CONT'D.)

| | | | | | | | |
|---|---|---|---|---|---|---|---|
| A0311-000 | | | | | | | |
| 0000366516 | 0002166576 | 0000337041 | 0000200130 | 0005623273 | 0000400000 | 0002120543 | 0005211243 |
| 0001145577 | 0001272376 | 0003541263 | 0000534766 | 0004400000 | 0003650675 | 0002615050 | 0031270145 |
| 0003157313 | 0022476172 | 0017766535 | 1777777655 | 1777777655 | 0000000000 | 0000000000 | 0000000000 |
| 0000000000 | 0000000000 | 0017522357 | 0032503622 | 0013367172 | 0000536674 | 0000000000 | 0000000000 |
| 0000000000 | 0000366777 | 0002171146 | 0000340331 | 0000200605 | 0005622546 | 0000400000 | 0002120461 |
| 0005211270 | 0001151334 | 0001274227 | 0003503745 | 0000534353 | 0004400000 | 0003650624 | 0002621337 |
| 0032527753 | 0003317046 | 0023633340 | 0017741274 | 1777777650 | 1777777650 | 0000000000 | 0000000000 |
| 0000000000 | 0000000000 | 0000000000 | 0017504372 | 0032522405 | 0013365746 | 0000673605 | 0000000000 |
| 0000367325 | 0002173525 | 0000341733 | 0000201377 | 0005621631 | 0000400000 | 0002120374 | 0005211272 |
| 0001155331 | 0001276052 | 0003450322 | 0000534003 | 0004400000 | 0003650553 | 0002625474 | 0033635510 |
| 0003456605 | 0024771654 | 0017712132 | 1777777643 | 1777777643 | 0000000000 | 0000000000 | 0000000000 |
| 0000000000 | 0000000000 | 0017470332 | 0032533540 | 0013364675 | 0000777721 | 0000000000 | 0000367714 |
| 0002176020 | 0000343422 | 0000202310 | 0004520541 | 0000400000 | 0002120312 | 0005211252 | 0001161472 |
| 0001277652 | 0003416205 | 0000533514 | 0004400000 | 0003650502 | 0002631436 | 0034624742 | 0003616347 |
| 0026130223 | 0017660645 | 1777777636 | 1777777636 | 0000000000 | 0000000000 | 0000000000 | 0000000000 |
| 0000000000 | 0017456543 | 0032541244 | 0013363776 | 0001065676 | 0000000000 | 0000000000 | 0000000000 |
| | | | | | | | |
| A0312-000 | | | | | | | |
| 0000370337 | 0002200150 | 0000345144 | 0000203332 | 0005617323 | 0000400000 | 0002120231 | 0005211212 |
| 0001165705 | 0001301417 | 000336560 | 0000533317 | 0004400000 | 0003650431 | 0002635157 | 0035510072 |
| 0003756115 | 0027265571 | 0017625077 | 1777777631 | 1777777631 | 0000000000 | 0000000000 | 0000000000 |
| 0000000000 | 0000000000 | 0017447562 | 0032544463 | 0013363243 | 0001144441 | 0000000000 | 0000000000 |
| 0000000000 | 0000371007 | 0002202074 | 0000346667 | 0000204461 | 0005616013 | 0000400000 | 0002120156 |
| 0005211134 | 0001172074 | 0001303125 | 0003332662 | 0000533220 | 0004400000 | 0003650360 | 0002640447 |
| 0036302346 | 0004115666 | 0030424636 | 0017567054 | 1777777624 | 1777777624 | 0000000000 | 0000000000 |
| 0000000000 | 0000000000 | 0000000000 | 0017443562 | 0032545777 | 0013362645 | 0001216760 | 0000000000 |
| 0000000000 | 0000000000 | 0000000000 | 0000000000 | 0000000000 | 0000000000 | 0000000000 | 0000000000 |
| 0000000000 | 0000000000 | 0000000000 | 0000000000 | 0000000000 | 0000000000 | 0000000000 | 0000000000 |
| 0000000000 | 0000000000 | 0000000000 | 0000000000 | 0000000000 | 0000000000 | 0000000000 | 0000000000 |
| 0000000000 | 0000000000 | 0000000000 | 0000000000 | 0000000000 | 0000000000 | 0000000000 | 0000000000 |
| 0000000000 | 0000000000 | 0000000000 | 0000000000 | 0000000000 | 0000000000 | 0000000000 | 0000000000 |
| 0000000000 | 0000000000 | 0000000000 | 0000000000 | 0000000000 | 0000000000 | 0000000000 | 0000000000 |
| 0000000000 | 0000000000 | 0000000000 | 0000000000 | 0000000000 | 0000000000 | 0000000000 | 0000000000 |

PO-1050
(5/69)

UNITED STATES PATENT OFFICE
CERTIFICATE OF CORRECTION

Patent No. __3,614,682__  Dated __October 19, 1971__

Inventor(s) __Robert C. Smith__

It is certified that error appears in the above-identified patent and that said Letters Patent are hereby corrected as shown below:

Column 16, after line 34 and after Table VI, installment beginning "AO 311-000", insert

TABLE VII
MEMORY MAP--TRACKS 305-7 AND 310-12

TRW-330 STORAGE IDENTIFICATION

Page ___ of ___  Program _____

Date _____  Programmer _____

Track __305__

| | Input from 10 | | Reactor 64-1 | | Reactor 64-2 | | Reactor 64-3 |
|---|---|---|---|---|---|---|---|
| 0 | Bd 1 | 40 | | 100 | | 140 | |
| 1 | Bd 2 | 41 | Bd 1 | 101 | | 141 | |
| 2 | Bd 3 | 42 | Bd 2 | 102 | | 142 | |
| 3 | Bd 4 | 43 | Bd 3 | 103 | | 143 | |
| 4 | Modifier | 44 | Bd 4 | 104 | | 144 | |
| 5 | Activator | 45 | Modifier | 105 | | 145 | |
| 6 | Soap Pts. | 46 | Activator | 106 | | 146 | |
| 7 | Soap pH | 47 | Soap Pts. | 107 | | 147 | |
| 10 | Bd 6 | 50 | Soap pH | 110 | | 150 | |
| 11 | Sty 2 | 51 | Bd 6 | 111 | | 151 | |
| 12 | % D2 | 52 | Sty 2 | 112 | | 152 | |
| 13 | Rate | 53 | % D2 | 113 | Reactor 64-2 Variables and Spacing Identical to Reactor 64-1 | 153 | Reactor 64-3 Variables and Spacing Identical to Reactor 64-1 |
| 14 | P.C. Density | 54 | Rate | 114 | | 154 | |
| 15 | B.P. | 55 | P.C. Density | 115 | | 155 | |
| 16 | Sty 3 | 56 | P.C. Temp. | 116 | | 156 | |
| 17 | Conv | 57 | | 117 | | 157 | |
| 20 | DT | 60 | CONV | 120 | | 160 | |
| 21 | HDT | 61 | DT | 121 | | 161 | |
| 22 | CAT | 62 | HDT | 122 | | 162 | |
| 23 | 0 | 63 | CAT | 123 | | 163 | |
| 24 | 0 | 64 | 0 | 124 | | 164 | |
| 25 | 0 | 65 | 0 | 125 | | 165 | |
| 26 | 0 | 66 | 0 | 126 | | 166 | |
| 27 | 0 | 67 | 0 | 127 | | 167 | |
| 30 | 0 | 70 | 0 | 130 | | 170 | |
| 31 | 0 | 71 | 0 | 131 | | 171 | |
| 32 | IO CONV | 72 | 0 | 132 | | 172 | |
| 33 | HDT* | 73 | IO CONV | 133 | | 173 | |
| 34 | IOHDT | 74 | HDT* | 134 | | 174 | |
| 35 | XCAT Pts | 75 | IO HDT | 135 | | 175 | |
| 36 | | 76 | XCAT Pts | 136 | Reactor 64-3 | 176 | |
| 37 | | 77 | | 137 | | 177 | |

FO-1050
(5/69)

UNITED STATES PATENT OFFICE
CERTIFICATE OF CORRECTION

Patent No. 3,614,682     Dated October 19, 1971

Inventor(s) Robert C. Smith

It is certified that error appears in the above-identified patent and that said Letters Patent are hereby corrected as shown below:

Column 16, after line 34 and after Table VII, installment headed "Track 305", insert

TABLE VII (CONT'D.)

TRW-330 STORAGE IDENTIFICATION

Page ____ of _____        Program _____

Date _____        Programmer _____

Track __306__

| Reactor 64-4 | Reactor 64-5 | Reactor 64-6 | Reactor 64-9 |
|---|---|---|---|
| 0 | 40 | 100 | 140 |
| 1 | 41 | 101 | 141 |
| 2 | 42 | 102 | 142 |
| 3 | 43 | 103 | 143 |
| 4 | 44 | 104 | 144 |
| 5 | 45 | 105 | 145 |
| 6 | 46 | 106 | 146 |
| 7 | 47 | 107 | 147 |
| 10 | 50 | 110 | 150 |
| 11 | 51 | 111 | 151 |
| 12 | 52 | 112 | 152 |
| 13 | 53 | 113 | 153 |
| 14 | 54 | 114 | 154 |
| 15 | 55 | 115 | 155 |
| 16 | 56 | 116 | 156 |
| 17 | 57 | 117 | 157 |
| 20 | 60 | 120 | 160 |
| 21 | 61 | 121 | 161 |
| 22 | 62 | 122 | 162 |
| 23 | 63 | 123 | 163 |
| 24 | 64 | 124 | 164 |
| 25 | 65 | 125 | 165 |
| 26 | 66 | 126 | 166 |
| 27 | 67 | 127 | 167 |
| 30 | 70 | 130 | 170 |
| 31 | 71 | 131 | 171 |
| 32 | 72 | 132 | 172 |
| 33 | 73 | 133 | 173 |
| 34 | 74 | 134 | 174 |
| 35 | 75 | 135 | 175 |
| 36 | 76 | 136 | 176 |
| 37 | 77 | 137 | 177 |

(Reactor 64-4 Variables and Spacing Identical to Reactor 64-1; Reactor 64-5 Variables and Spacing Identical to Reactor 64-1; Reactor 64-6 Variables and Spacing Identical to Reactor 64-1; Reactor 64-9 Variables and Spacing Identical to Reactor 64-1)

.PO-1050
(5/69)

UNITED STATES PATENT OFFICE
CERTIFICATE OF CORRECTION

Patent No. __3,614,682__  Dated __October 19, 1971__

Inventor(s) __Robert C. Smith__

It is certified that error appears in the above-identified patent and that said Letters Patent are hereby corrected as shown below:

Column 16, after line 34 and after Table VII, installment headed "Track 306", insert

TABLE VII (CONT'D.)

TRW-330 STORAGE IDENTIFICATION

Page ___ of ___   Program ___
Date ___          Programmer ___

Track __307__

| Reactor 64-8 | Reactor 64-7 | Reactor 64-10 | Reactor 64-11 |
|---|---|---|---|
| (Reactor 64-8 Variables and Spacing Identical to Reactor 64-1) | (Reactor 64-7 Variables and Spacing Identical to Reactor 64-1) | (Reactor 64-10 Variables and Spacing Identical to Reactor 64-1) | (Reactor 64-11 Variables and Spacing Identical to Reactor 64-1) |

PO-1050
(5/69)

UNITED STATES PATENT OFFICE
CERTIFICATE OF CORRECTION

Patent No. 3,614,682     Dated October 19, 1971

Inventor(s) Robert C. Smith

It is certified that error appears in the above-identified patent and that said Letters Patent are hereby corrected as shown below:

Column 16, after line 34 and after Table VII, installment headed "Track 307", insert

TABLE VII (CONT'D.)

TRW-330 STORAGE IDENTIFICATION

Page____of_____          Program_____
Date_____              Programmer_____

Track 310

| Reactor 64-12 | Reactor 64-13 | Reactor 64-14 | Reactor 64-15 |
|---|---|---|---|
| 0 | 40 | 100 | 140 |
| 1 | 41 | 101 | 141 |
| 2 | 42 | 102 | 142 |
| 3 | 43 | 103 | 143 |
| 4 | 44 | 104 | 144 |
| 5 | 45 | 105 | 145 |
| 6 | 46 | 106 | 146 |
| 7 | 47 | 107 | 147 |
| 10 | 50 | 110 | 150 |
| 11 | 51 | 111 | 151 |
| 12 | 52 | 112 | 152 |
| 13 | 53 | 113 | 153 |
| 14 | 54 | 114 | 154 |
| 15 | 55 | 115 | 155 |
| 16 | 56 | 116 | 156 |
| 17 | 57 | 117 | 157 |
| 20 | 60 | 120 | 160 |
| 21 | 61 | 121 | 161 |
| 22 | 62 | 122 | 162 |
| 23 | 63 | 123 | 163 |
| 24 | 64 | 124 | 164 |
| 25 | 65 | 125 | 165 |
| 26 | 66 | 126 | 166 |
| 27 | 67 | 127 | 167 |
| 30 | 70 | 130 | 170 |
| 31 | 71 | 131 | 171 |
| 32 | 72 | 132 | 172 |
| 33 | 73 | 133 | 173 |
| 34 | 74 | 134 | 174 |
| 35 | 75 | 135 | 175 |
| 36 | 76 | 136 | 176 |
| 37 | 77 | 137 | 177 |

Reactor 64-12 Variables and Spacing Identical to Reactor 64-1
Reactor 64-13 Variables and Spacing Identical to Reactor 64-1
Reactor 64-14 Variables and Spacing Identical to Reactor 64-1
Reactor 64-15 Variables and Spacing Identical to Reactor 64-1

Reactor 64-15

FO-1050
(5/69)

UNITED STATES PATENT OFFICE
CERTIFICATE OF CORRECTION

Patent No. __3,614,682__  Dated __October 19, 1971__

Inventor(s) __Robert C. Smith__

It is certified that error appears in the above-identified patent and that said Letters Patent are hereby corrected as shown below:

Column 16, after line 34 and after Table VII, installment headed "Track 310", insert

TABLE VII (CONT'D.)

TRW-330 STORAGE IDENTIFICATION

Page ____ of ____          Program _____

Date _____          Programmer _____

Track __311__

| | Reactor 64-16 | | Reactor 64-17 | | Reactor 64-18 | | Reactor 64-19 | |
|---|---|---|---|---|---|---|---|---|
| 0 | | | 40 | | 100 | | 140 | |
| 1 | | | 41 | | 101 | | 141 | |
| 2 | | | 42 | | 102 | | 142 | |
| 3 | | | 43 | | 103 | | 143 | |
| 4 | | Reactor 64-16 Variables and Spacing Identical to Reactor 64-1 | 44 | Reactor 64-17 Variables and Spacing Identical to Reactor 64-1 | 104 | Reactor 64-18 Variables and Spacing Identical to Reactor 64-1 | 144 | Reactor 64-19 Variables and Spacing Identical to Reactor 64-1 |
| 5 | | | 45 | | 105 | | 145 | |
| 6 | | | 46 | | 106 | | 146 | |
| 7 | | | 47 | | 107 | | 147 | |
| 10 | | | 50 | | 110 | | 150 | |
| 11 | | | 51 | | 111 | | 151 | |
| 12 | | | 52 | | 112 | | 152 | |
| 13 | | | 53 | | 113 | | 153 | |
| 14 | | | 54 | | 114 | | 154 | |
| 15 | | | 55 | | 115 | | 155 | |
| 16 | | | 56 | | 116 | | 156 | |
| 17 | | | 57 | | 117 | | 157 | |
| 20 | | | 60 | | 120 | | 160 | |
| 21 | | | 61 | | 121 | | 161 | |
| 22 | | | 62 | | 122 | | 162 | |
| 23 | | | 63 | | 123 | | 163 | |
| 24 | | | 64 | | 124 | | 164 | |
| 25 | | | 65 | | 125 | | 165 | |
| 26 | | | 66 | | 126 | | 166 | |
| 27 | | | 67 | | 127 | | 167 | |
| 30 | | | 70 | | 130 | | 170 | |
| 31 | | | 71 | | 131 | | 171 | |
| 32 | | | 72 | | 132 | | 172 | |
| 33 | | | 73 | | 133 | | 173 | |
| 34 | | | 74 | | 134 | | 174 | |
| 35 | | | 75 | | 135 | | 175 | |
| 36 | | | 76 | | 136 | Reactor 64-19 | 176 | |
| 37 | | | 77 | | 137 | | 177 | |

PO-1050
(5/69)

UNITED STATES PATENT OFFICE
CERTIFICATE OF CORRECTION

Patent No. __3,614,682__      Dated __October 19, 1971__

Inventor(s) __Robert C. Smith__

It is certified that error appears in the above-identified patent and that said Letters Patent are hereby corrected as shown below:

Column 16, after line 34 and after Table VII, installment headed "Track 311", insert

TABLE VII (CONT'D.)

TRW-330 STORAGE IDENTIFICATION

Page ___ of ___      Program ___

Date ___      Programmer ___

Track __312__

| Reactor 64-20 | Reactor 64-21 | | |
|---|---|---|---|
| 0 | 40 | 100 | 140 |
| 1 | 41 | 101 | 141 |
| 2 | 42 | 102 | 142 |
| 3 | 43 | 103 | 143 |
| 4 | 44 | 104 | 144 |
| 5 | 45 | 105 | 145 |
| 6 | 46 | 106 | 146 |
| 7 | 47 | 107 | 147 |
| 10 | 50 | 110 | 150 |
| 11 | 51 | 111 | 151 |
| 12 | 52 | 112 | 152 |
| 13 | 53 | 113 | 153 |
| 14 | 54 | 114 | 154 |
| 15 | 55 | 115 | 155 |
| 16 | 56 | 116 | 156 |
| 17 | 57 | 117 | 157 |
| 20 | 60 | 120 | 160 |
| 21 | 61 | 121 | 161 |
| 22 | 62 | 122 | 162 |
| 23 | 63 | 123 | 163 |
| 24 | 64 | 124 | 164 |
| 25 | 65 | 125 | 165 |
| 26 | 66 | 126 | 166 |
| 27 | 67 | 127 | 167 |
| 30 | 70 | 130 | 170 |
| 31 | 71 | 131 | 171 |
| 32 | 72 | 132 | 172 |
| 33 | 73 | 133 | 173 |
| 34 | 74 | 134 | 174 |
| 35 | 75 | 135 | 175 |
| 36 | 76 | 136 | 176 |
| 37 | 77 | 137 | 177 |

(Reactor 64-20 Variables and Spacing Identical to Reactor 64-1; Reactor 64-21 Variables and Spacing Identical to Reactor 64-1)

UNITED STATES PATENT OFFICE
CERTIFICATE OF CORRECTION

Patent No. 3,614,682     Dated October 19, 1971

Inventor(s) Robert C. Smith

It is certified that error appears in the above-identified patent and that said Letters Patent are hereby corrected as shown below:

Column 16, after line 70, insert

TABLE IX
TYPICAL DUMP OF TRACK 43

| | | | | | | | |
|---|---|---|---|---|---|---|---|
| A0043-000 | | | | | | | |
| 0025715010 | 0025773062 | 0025531636 | 0026244043 | 0026244043 | 0026436751 | 0026746514 | 0026302624 |
| 0026156234 | 0025724544 | 0027722145 | 0030000220 | 0030017510 | 0027722145 | 0027741436 | 0027712411 |
| 0027751172 | 0027770463 | 0030000220 | 0030000220 | 0030000220 | 0000000000 | 0000000000 | 0000000000 |
| 0000000000 | 0000000000 | 0000000000 | 0000000000 | 0000000000 | 0000000000 | 0000000000 | 0000000000 |
| 0026000000 | 0030000000 | 0030000000 | 0030000000 | 0030000000 | 0030000000 | 0030000000 | 0030000000 |
| 0030000000 | 0030000000 | 0030000000 | 0030000000 | 0000000000 | 0000000000 | 0012700001 | 0007300001 |
| 0006200001 | 0000000001 | 0017440001 | 0000000000 | 0011350001 | 0017770001 | 0000000000 | 0000000000 |
| 0000000000 | 0000000000 | 0000000000 | 0000000000 | 0002220002 | 0000000000 | 0000000000 | 0000000000 |
| 0043400000 | 0000000000 | 0016400000 | 0000000000 | 0002114631 | 0000000000 | 0000400001 | 0000000000 |
| 0017735054 | 0000000000 | 0005654770 | 0000000000 | 0005777771 | 0000000000 | 0000000000 | 0000000000 |
| 0000400000 | 0000000000 | 0000000000 | 0000400000 | 0000400000 | 0000000000 | 0000414646 | 0000000000 |
| 0000327556 | 0000000000 | 0000345730 | 0000000000 | 0000264551 | 0000000000 | 0000400000 | 0000000000 |
| 0034164476 | 0000365614 | 0010151503 | 0002153455 | 0052354076 | 0000332100 | 0000000001 | 0000176767 |
| 0001334012 | 0045147440 | 0026323157 | 0001127047 | 0001116672 | 0000375351 | 0000000000 | 0001324414 |
| 0000000000 | 0002631540 | 0004400000 | 0055114517 | 0017700407 | 0001000000 | 0023251770 | 0055114517 |
| 0037406112 | 0000231463 | 0006024360 | 0052401250 | 0005227025 | 0000000000 | 0001143657 | 0043223147 |

PO-1050
(5/69)

UNITED STATES PATENT OFFICE
CERTIFICATE OF CORRECTION

Patent No. 3,614,682     Dated   October 19, 1971

Inventor(s)   Robert C. Smith

It is certified that error appears in the above-identified patent and that said Letters Patent are hereby corrected as shown below:

Column 16, after line 70 and after Table IX, should be inserted

TABLE XII
MEMORY MAP FOR TRACK 54

TRW-330 STORAGE IDENTIFICATION

Page ___ of ___          Program _____
Date _____         Programmer _____

Track   54

| | | | | | | | |
|---|---|---|---|---|---|---|---|
| 0 | | 40 | | 100 | | 140 Bd Base Rate | |
| 1 | | 41 | | 101 | | 141 Bd Base Pts | |
| 2 | | 42 | | 102 | | 142 Sty " Rate | |
| 3 | | 43 | | 103 | | 143 Sty " Pts | |
| 4 | | 44 | | 104 | | 144 Soap " Rate | |
| 5 | | 45 | | 105 | | 145 Soap " Pts | |
| 6 | | 46 | | 106 | | 146 ACT " Rate | |
| 7 | | 47 | | 107 | | 147 ACT " Pts | |
| 10 | | 50 | | 110 | | 150 CAT " Rate | X100 |
| 11 | | 51 | | 111 | | 151 CAT " Pts | X1000 |
| 12 | | 52 | | 112 | | 152 MOD " Rate | X100 |
| 13 | | 53 | | 113 | | 153 MOD " Pts | X100 |
| 14 | | 54 | | 114 | | 154 SS " Rate | |
| 15 | | 55 | | 115 | | 155 SS " Pts | X100 |
| 16 | | 56 | | 116 | | 156 XCAT" Rate | X100 |
| 17 | | 57 | | 117 | | 157 XCAT" Pts | X1000 |
| 20 | | 60 | | 120 | | 160 Bd target pts | |
| 21 | | 61 | | 121 | | 161 | |
| 22 | | 62 | | 122 | | 162 Sty target pts | |
| 23 | | 63 | | 123 | | 163 | |
| 24 | | 64 | | 124 | | 164 Soap target pts | |
| 25 | | 65 | | 125 | | 165 | |
| 26 | | 66 | | 126 | | 166 ACT target pts | |
| 27 | | 67 | | 127 | | 167 | |
| 30 | | 70 | | 130 | | 170 CAT target | ptsX10$^3$ |
| 31 | | 71 | | 131 | | 171 | |
| 32 | | 72 | | 132 | | 172 MOD Target pts* | |
| 33 | | 73 | | 133 | | 173 | |
| 34 | | 74 | | 134 | | 174 SS Target pts* | |
| 35 | | 75 | | 135 | | 175 | |
| 36 | | 76 | | 136 | | 176 XCAT target pts** | |
| 37 | | 77 | | 137 | | 177 | |

\* = X100
\*\* = X1000

PO-1050
(5/69)

UNITED STATES PATENT OFFICE
CERTIFICATE OF CORRECTION

Patent No. 3,614,682     Dated October 19, 1971

Inventor(s) Robert C. Smith

It is certified that error appears in the above-identified patent and that said Letters Patent are hereby corrected as shown below:

Column 16, after line 70 and after Table X, should be inserted

TABLE X
MEMORY MAP FOR TRACK 43
TRW-330 STORAGE IDENTIFICATION

Page ___ of ___    Program _____

Date _____   Programmer _____

Track 43

| | | | | | | | | |
|---|---|---|---|---|---|---|---|---|
| 0 | | (64-1 | 40 | (64-1 to 64-10 | 100 | Bd input | 140 | Bd flow |
| 1 | | -2 | 41 | | 64-11 | 101 | " | 141 | Bd peak #1 |
| 2 | | -3 | 42 | | 64-12 | 102 | Sty " | 142 | Sty flow |
| 3 | | -4 | 43 | | 64-13 | 103 | | 143 | Bd peak #2 |
| 4 | | -5 | 44 | | 64-14 | 104 | Soap Soln." | 144 | Soap flow |
| 5 | | -6 | 45 | | 64-15 | 105 | | 145 | Bd peak #3 |
| 6 | | -7 | 46 | | 64-16 | 106 | ACT " | 146 | ACT flow |
| 7 | | -8 | 47 | | 64-17 | 107 | | 147 | Bd peak #4 |
| 10 | | -9 | 50 | | 64-18 | 110 | CAT " | 150 | CAT flow |
| 11 | | -10 | 51 | | 64-19 | 111 | | 151 | Bd peak #5 |
| 12 | | -11 | 52 | | 64-20 | 112 | Mod " | 152 | MOD flow |
| 13 | | -12 | 53 | | 64-21 | 113 | | 153 | Bd peak #6 |
| 14 | | -13 | 54 | | | 114 | SS " | 154 | SS flow |
| 15 | | -14 | 55 | | | 115 | | 155 | Sty peak #1 |
| 16 | | -15 | 56 | Densitometer 102 | | 116 | XCAT " | 156 | " |
| 17 | | -16 | 57 | Densitometer 94 | | 117 | | 157 | " " #2 |
| 20 | | -17 | 60 | Densitometer 96 | | 120 | Bd R Value | 160 | |
| 21 | | -18 | 61 | Prechg. D. | | 121 | | 161 | " " #3 |
| 22 | | -19 | 62 | Soap pH | | 122 | Sty " " | 162 | Prechg. D. |
| 23 | | -20 | 63 | Soap Conc. | | 123 | | 163 | Sty purity |
| 24 | | -21 | 64 | % O2 | | 124 | Soap" " | 164 | D. at 94 |
| 25 | | | 65 | | | 125 | | 165 | Sty Bld Rat |
| 26 | | | 66 | | | 126 | ACT " " | 166 | D. at 94 |
| 27 | | | 67 | | | 127 | | 167 | LISB Sty |
| 30 | | | 70 | | | 130 | CAT " " | 170 | D. at 102 |
| 31 | | | 71 | SS flow 81 | | 131 | | 171 | Bd Bld Rat |
| 32 | | | 72 | Mod flow 59 | | 132 | Mod " " | 172 | % O2 |
| 33 | | | 73 | CAT flow 57 | | 133 | | 173 | LISB Bd |
| 34 | | | 74 | ACT flow 55 | | 134 | SS " " | 174 | Soap pH |
| 35 | | | 75 | Soap Soln.Flow 53 | | 135 | | 175 | |
| 36 | | | 76 | Sty flow 51 | | 136 | XCAT " " | 176 | Soap Conc |
| 37 | | | 77 | Bd flow 49 | | 137 | | 177 | |

Abbreviations:
Prechg. = pre-charge
D. = density
SS = shortstop
Mod = modifier
CAT = initial catalyst at 101
ACT = activator
Sty = styrene
Bd = butadiene
R value = multiplier for output setpoint for flow of ingredient noted input = parts per 100 parts of monomers
XCAT = incremental catalyst at 92
flow = flow in gallons per minute
peak = a peak reading for chromatograph of the material in question
Bld Rat = ratio of blending of fresh and recycle monomer
LISB = last in-specification-blend ratio

-53-

Signed and sealed this 26th day of December 1972.

(SEAL)
Attest:

EDWARD M. FLETCHER, JR.         ROBERT GOTTSCHALK
Attesting Officer                 Commissioner of Patents